United States Patent
Rutherford et al.

(10) Patent No.: US 9,021,990 B2
(45) Date of Patent: May 5, 2015

(54) PET TOY AND METHOD OF MAKING A PET TOY

(75) Inventors: Ryan Rutherford, Belleville, NJ (US); Jonathan Willinger, Tenafly, NJ (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 144 days.

(21) Appl. No.: 13/164,058

(22) Filed: Jun. 20, 2011

(65) Prior Publication Data

US 2011/0277696 A1  Nov. 17, 2011

Related U.S. Application Data

(63) Continuation-in-part of application No. 12/877,320, filed on Sep. 8, 2010.

(60) Provisional application No. 61/370,917, filed on Aug. 5, 2010, provisional application No. 61/301,728, filed on Feb. 5, 2010.

(51) Int. Cl.
*A01K 29/00* (2006.01)
*A01K 11/00* (2006.01)

(52) U.S. Cl.
CPC ..................... *A01K 15/026* (2013.01)

(58) Field of Classification Search
USPC ............. 119/707, 709–711; 220/595.54, 739, 220/592.4; 473/571
See application file for complete search history.

(56) References Cited

U.S. PATENT DOCUMENTS

| | | | |
|---|---|---|---|
| 1,534,964 A | 4/1925 | Kahnweiler | |
| 1,789,333 A * | 1/1931 | Da Costa | 473/571 |
| 2,003,957 A * | 6/1935 | Salisbury | 446/409 |
| 4,223,636 A | 9/1980 | Dishong | |
| 5,476,408 A * | 12/1995 | Hoeting et al. | 446/419 |
| 5,560,320 A | 10/1996 | Plunk | |
| 5,611,721 A * | 3/1997 | Hoeting et al. | 446/419 |
| 6,112,703 A | 9/2000 | Handelsman | |
| 6,186,095 B1 * | 2/2001 | Simon | 119/707 |
| 6,474,268 B1 | 11/2002 | Suchowski et al. | |
| 6,550,426 B2 * | 4/2003 | Tsengas | 119/707 |
| 6,935,274 B1 * | 8/2005 | Rothschild | 119/702 |
| 7,063,044 B2 | 6/2006 | Handelsman et al. | |
| 7,950,352 B2 * | 5/2011 | Specht | 119/707 |
| 7,950,353 B2 * | 5/2011 | Axelrod et al. | 119/709 |

(Continued)

OTHER PUBLICATIONS

United States Office Action dated Mar. 14, 2012, from corresponding U.S. Appl. No. 12/877,320.

*Primary Examiner* — Kristen C Hayes

(74) *Attorney, Agent, or Firm* — Eckert Seamans Cherin & Mellott, LLC; Brij K. Agarwal

(57) ABSTRACT

A multi-material pet toy includes a first member having an attractant for making the multi-material pet toy interesting to a pet and a second member for protecting the first member to lengthen a serviceable life of the first member. The toy may be configured so that the first member includes a sound-producing member for making a noise without air movement passing through the sound-producing member, and the second member includes a protective member for protecting the sound-producing member. The toy may also be configured so that the first member includes a mouth-feel member for providing attraction for the pet with the noise of air movement passing through the mouth-feel member, and the second member includes a protective member for protecting the mouth-feel member.

9 Claims, 16 Drawing Sheets

(56) References Cited

U.S. PATENT DOCUMENTS

| | | |
|---|---|---|
| 8,042,493 B2 | 10/2011 | Jacobs |
| 8,186,309 B2 * | 5/2012 | Specht .......................... 119/707 |
| 8,235,762 B2 * | 8/2012 | Rutherford et al. ........... 446/184 |
| 8,297,469 B1 * | 10/2012 | Alford et al. .................. 220/737 |
| 8,322,308 B2 * | 12/2012 | Curry et al. ................... 119/707 |
| 8,678,229 B1 * | 3/2014 | Alford et al. .................. 220/737 |
| 2007/0099539 A1 | 5/2007 | Fullmer |
| 2009/0025648 A1 * | 1/2009 | Simon ........................... 119/707 |
| 2009/0255482 A1 * | 10/2009 | Santarsiero ................... 119/707 |
| 2010/0199924 A1 * | 8/2010 | del Pinal et al. .............. 119/707 |
| 2010/0326369 A1 | 12/2010 | Freeman et al. |
| 2012/0090554 A1 * | 4/2012 | Nunn et al. ................... 119/707 |

\* cited by examiner

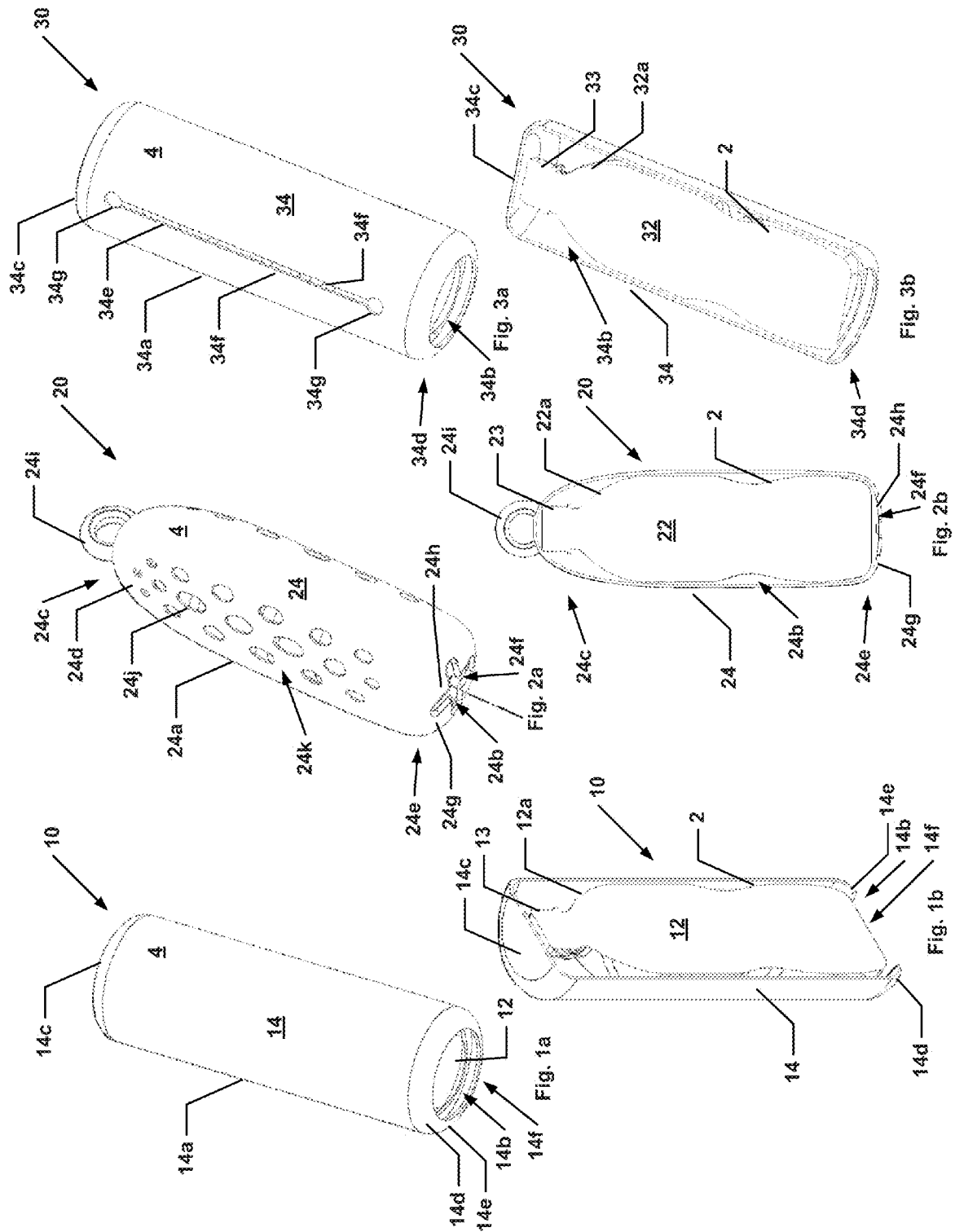

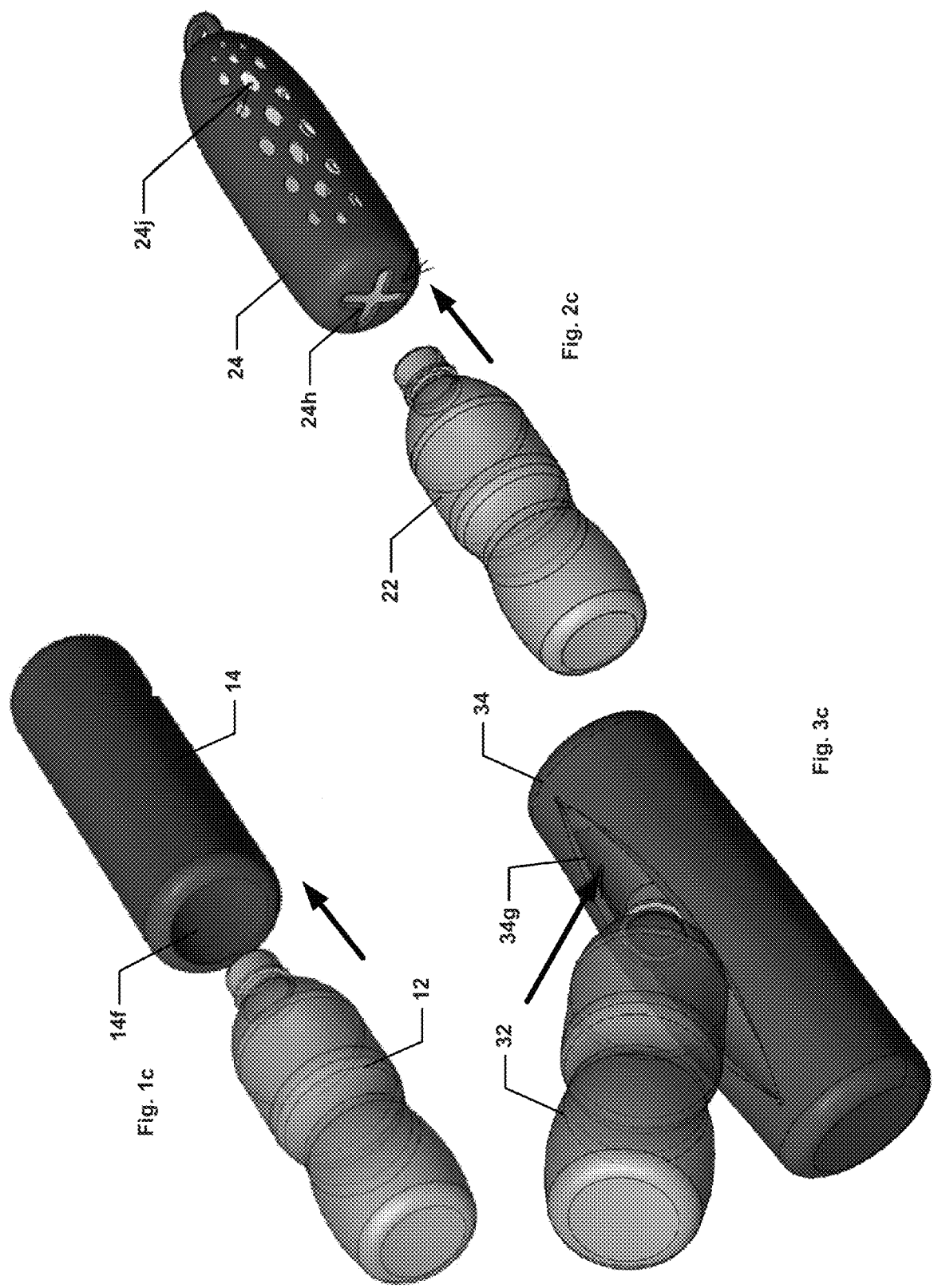

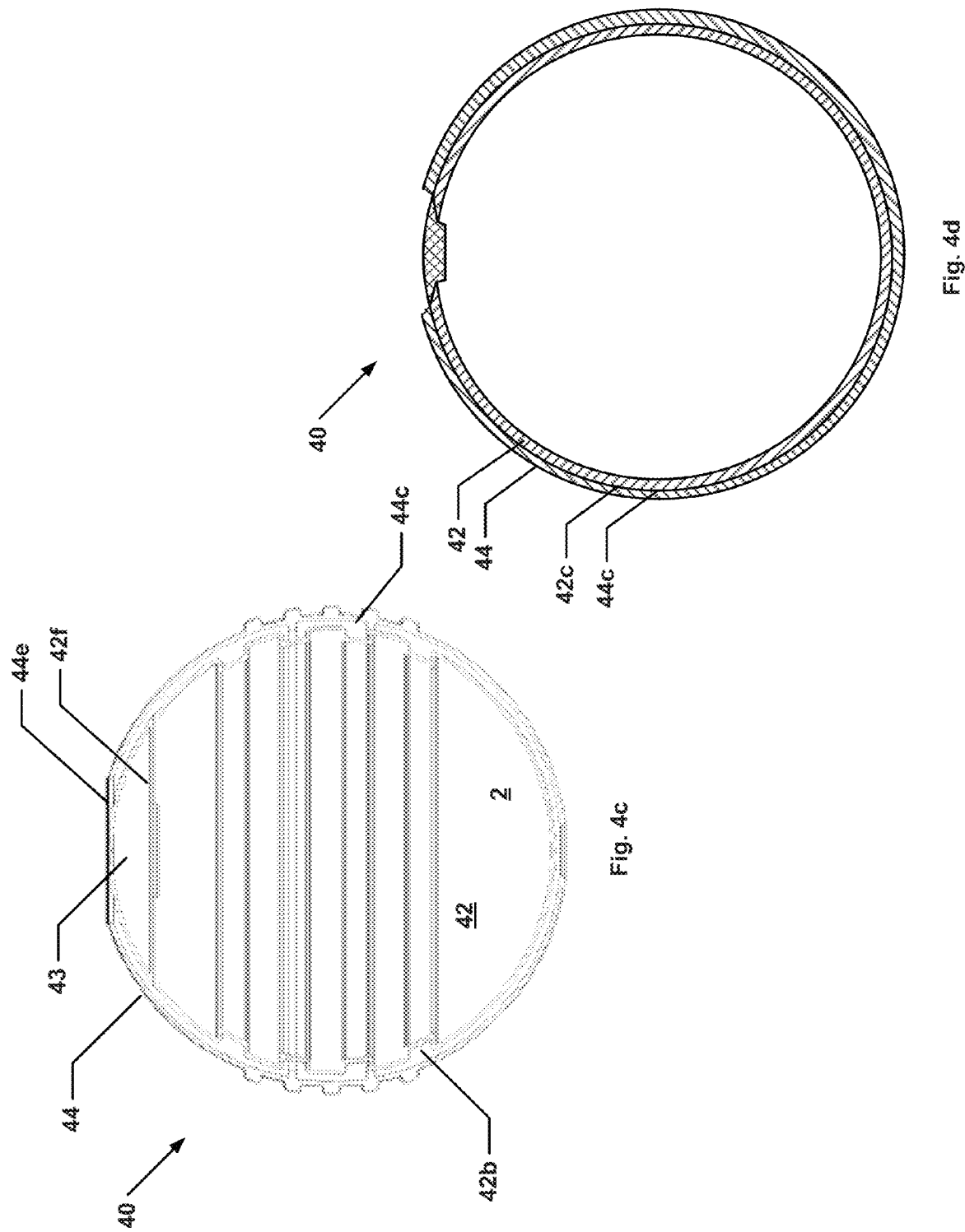

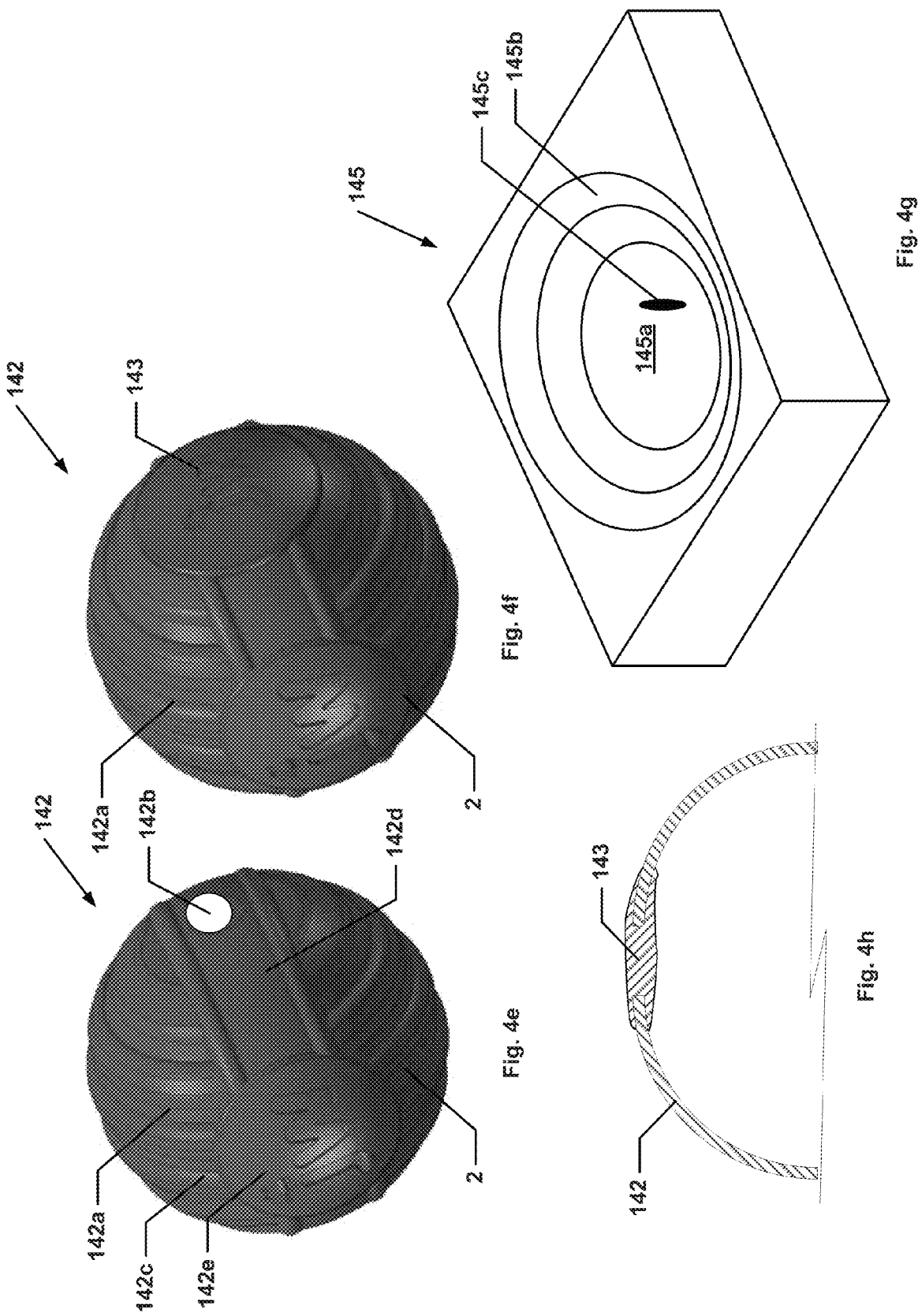

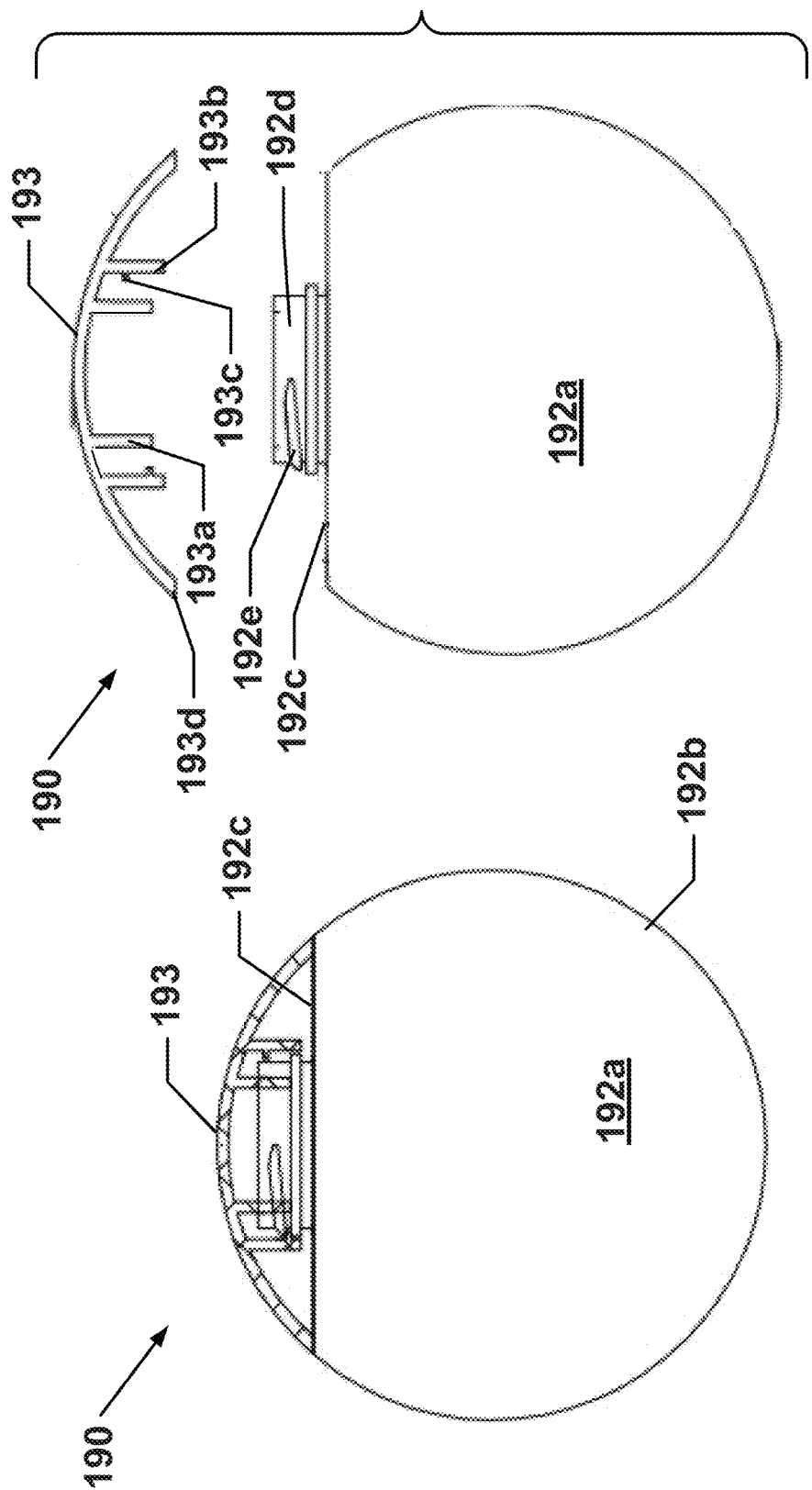

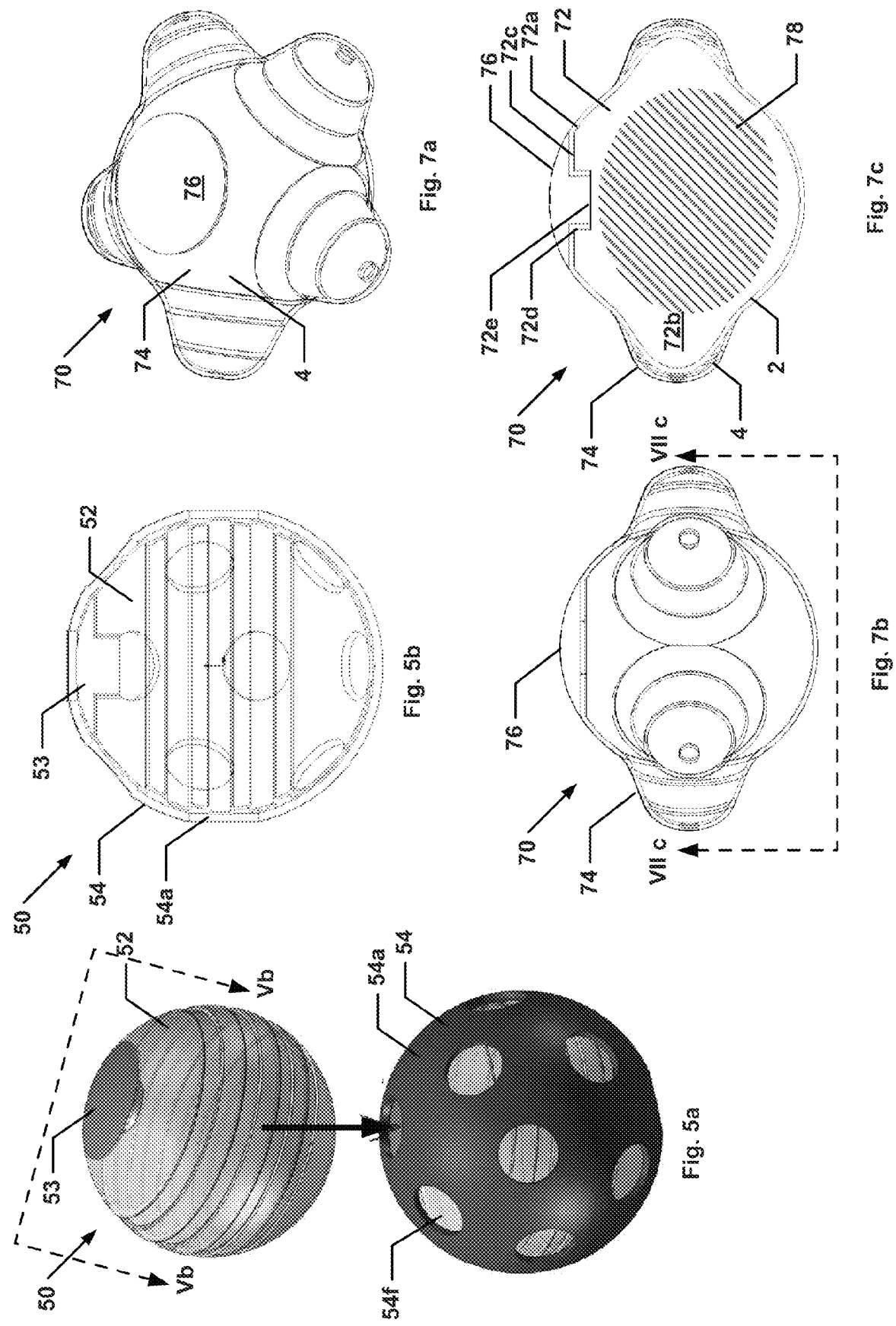

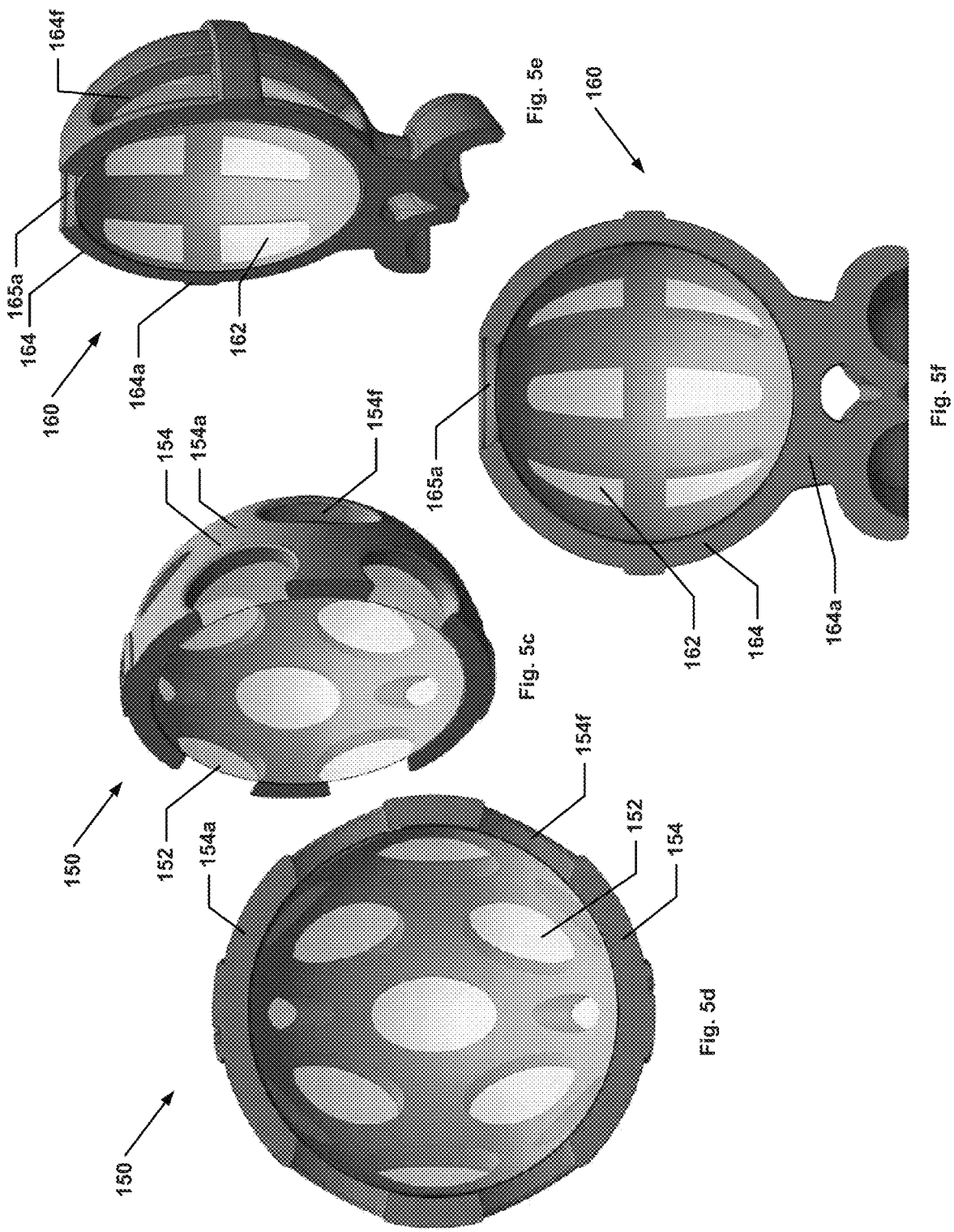

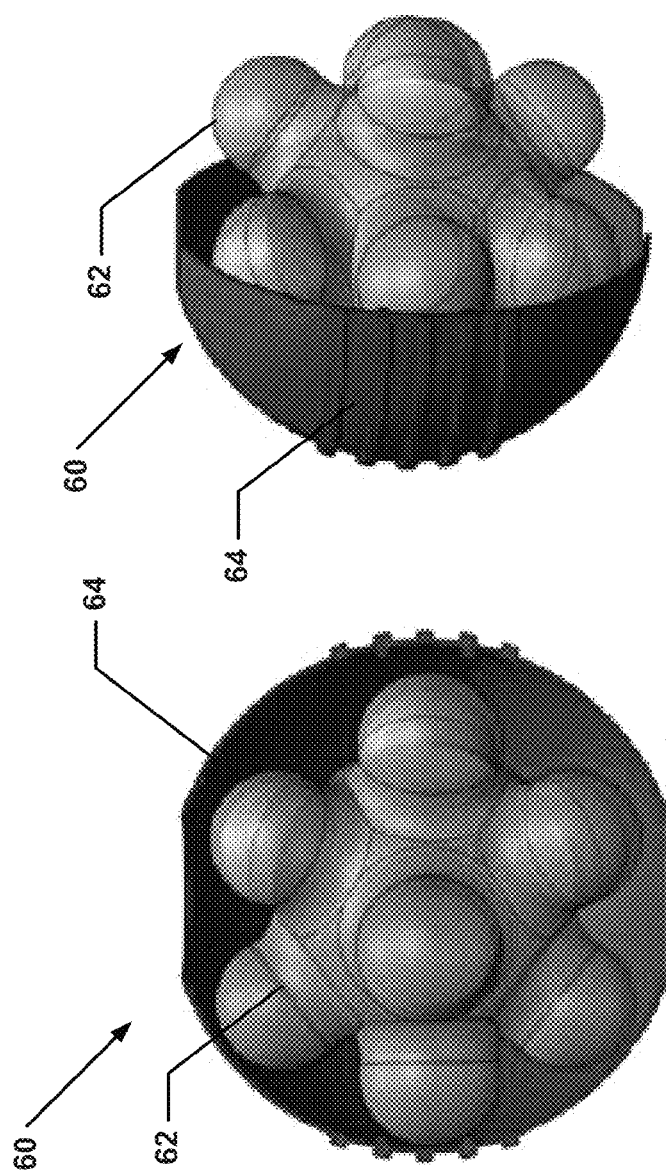
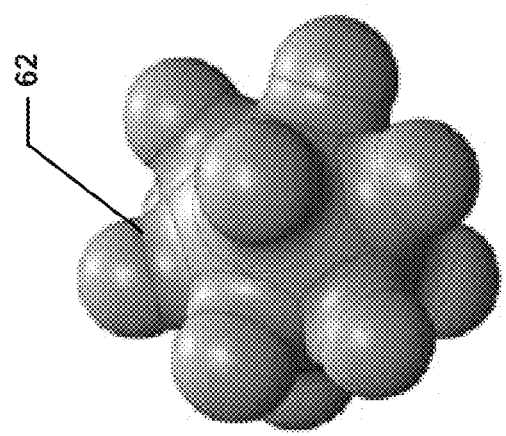
Fig. 6c
Fig. 6b
Fig. 6a

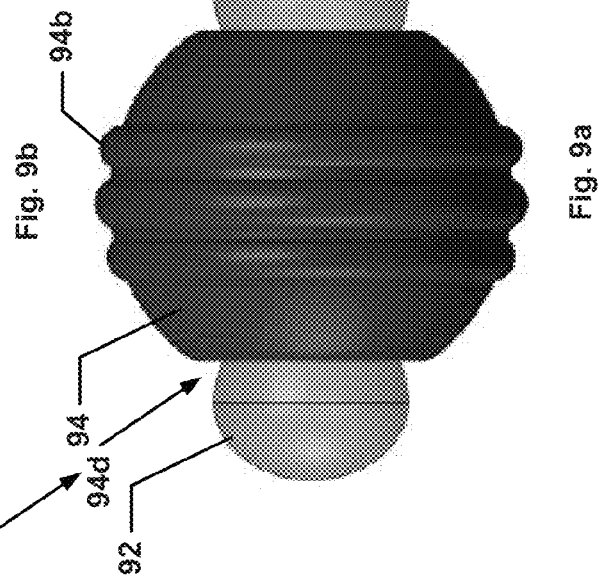
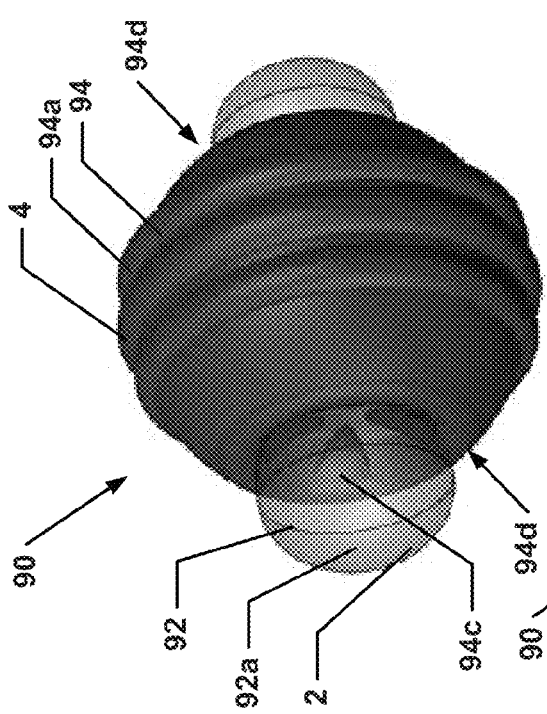
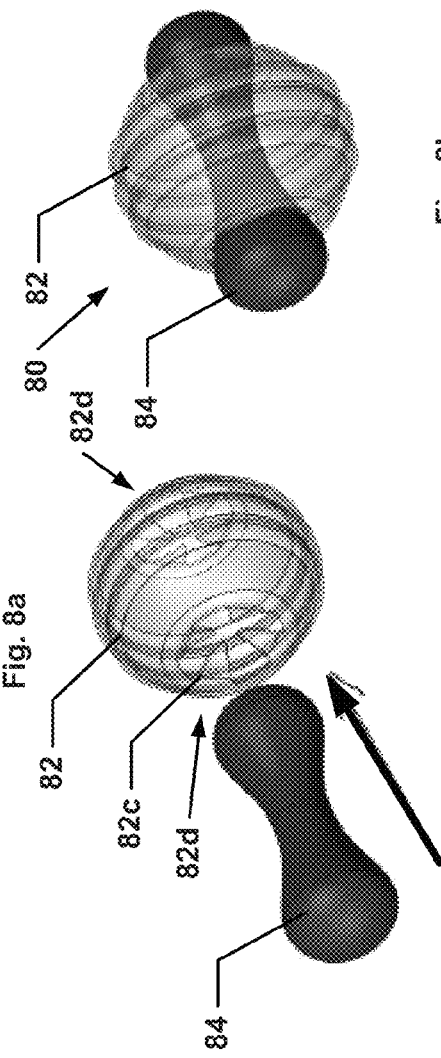
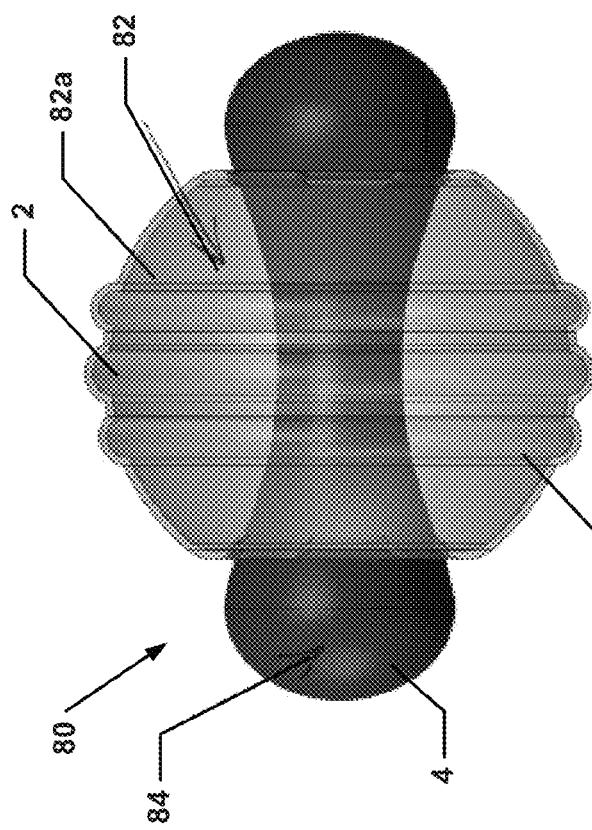

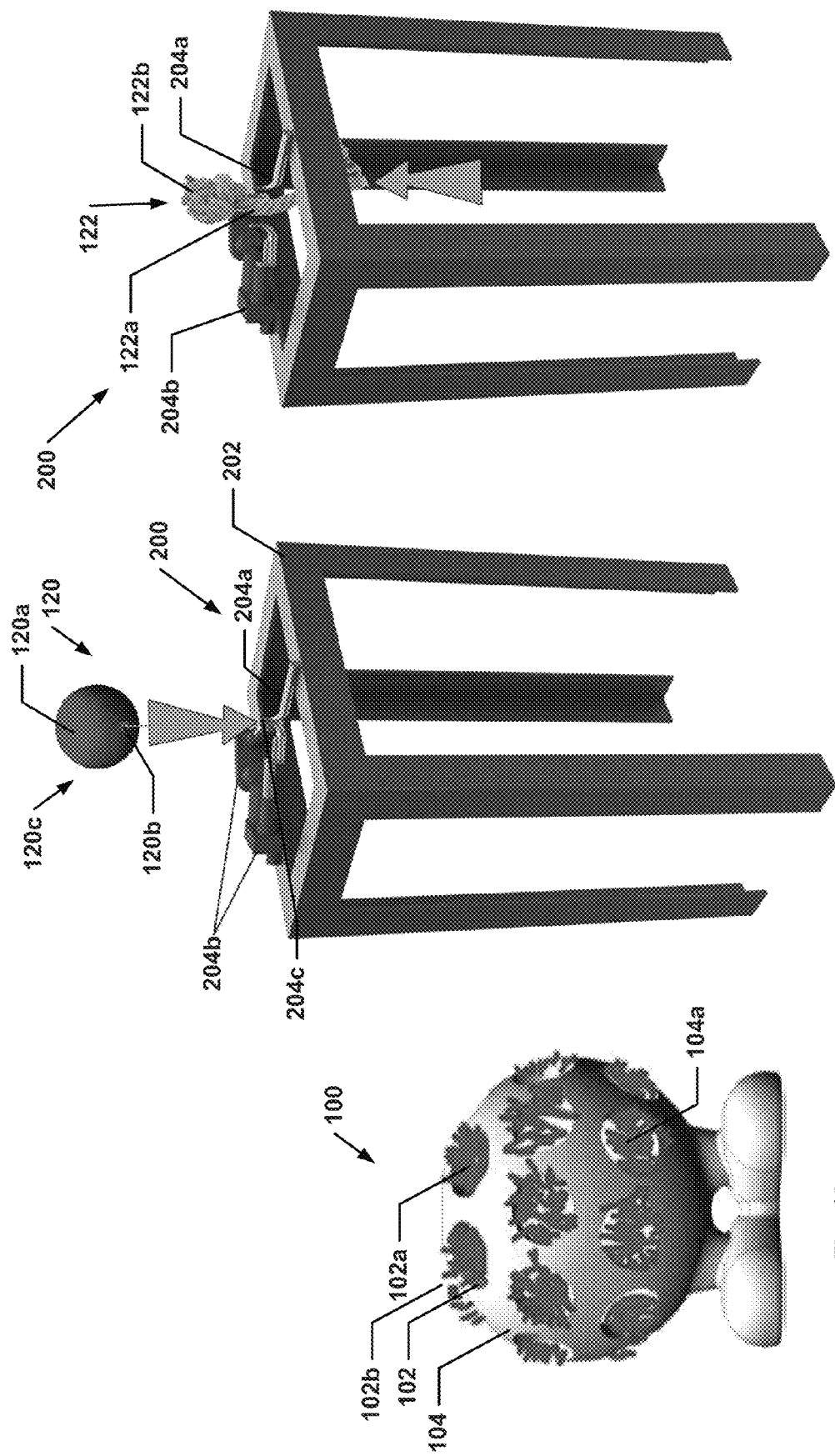

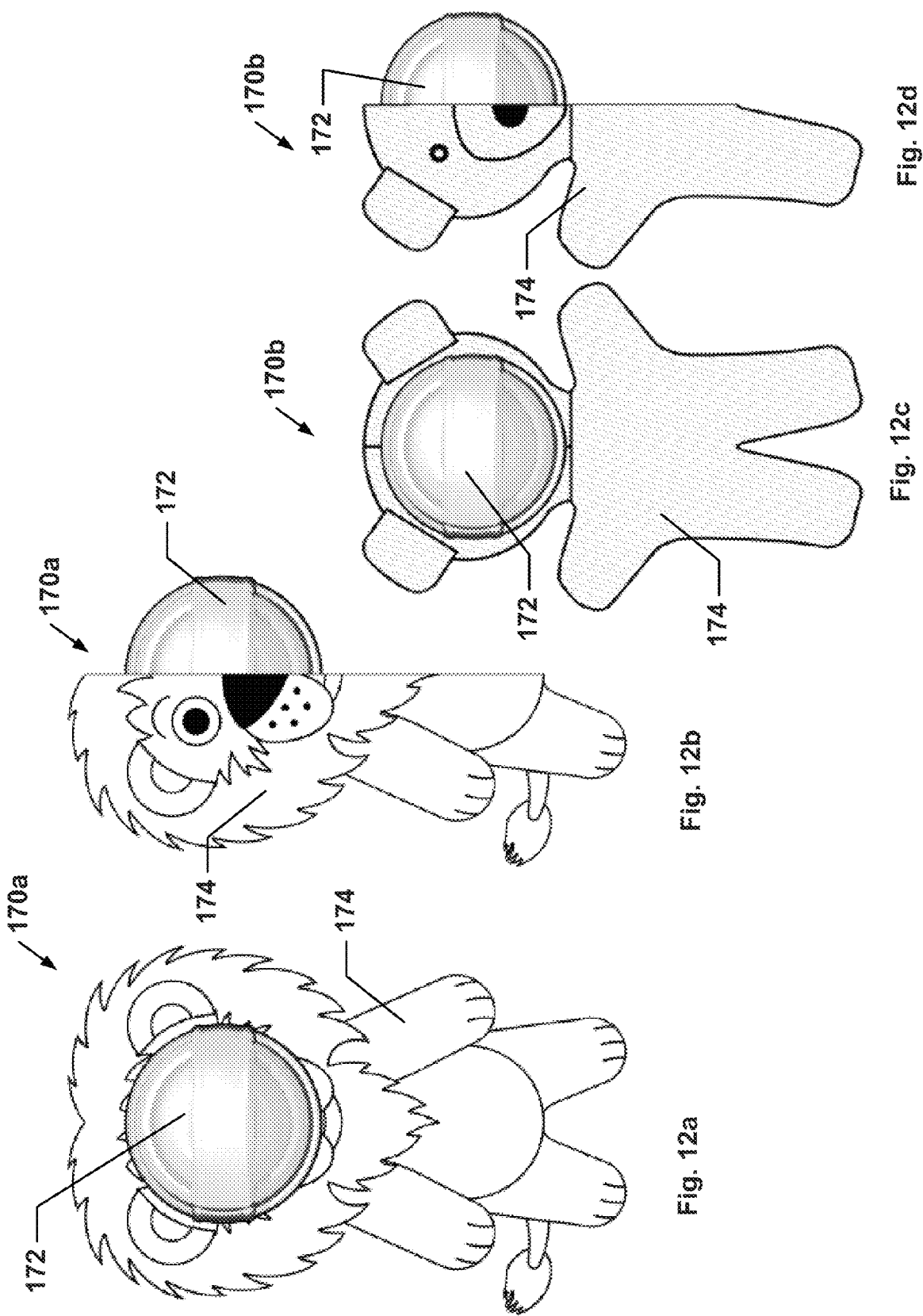

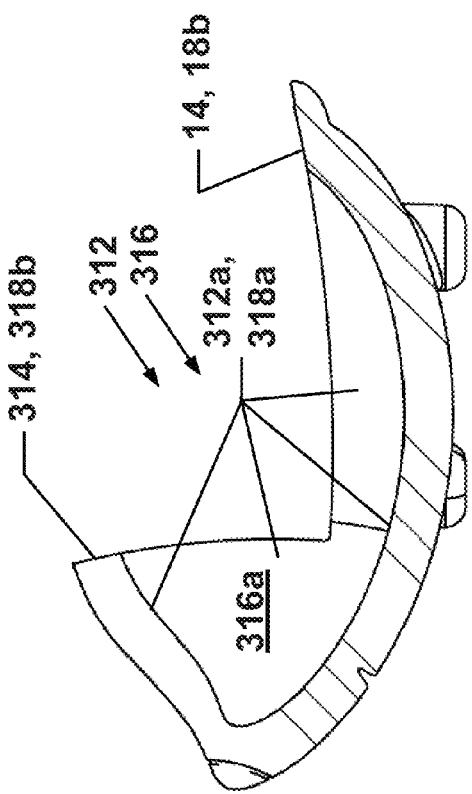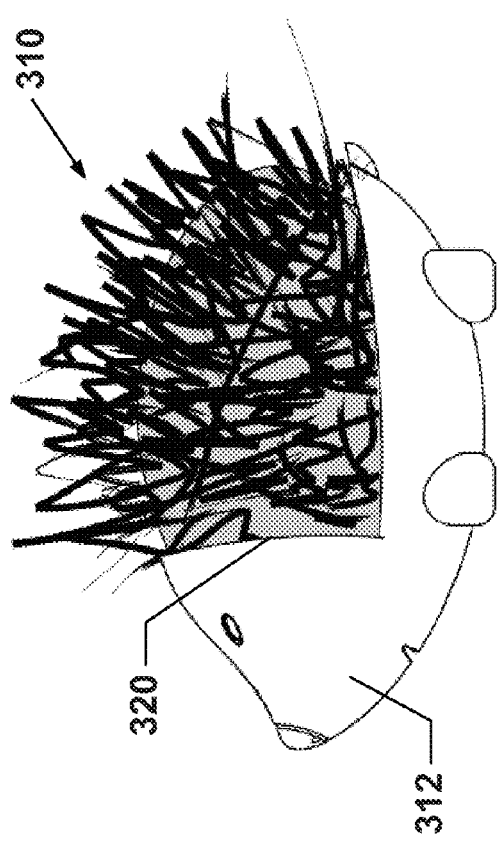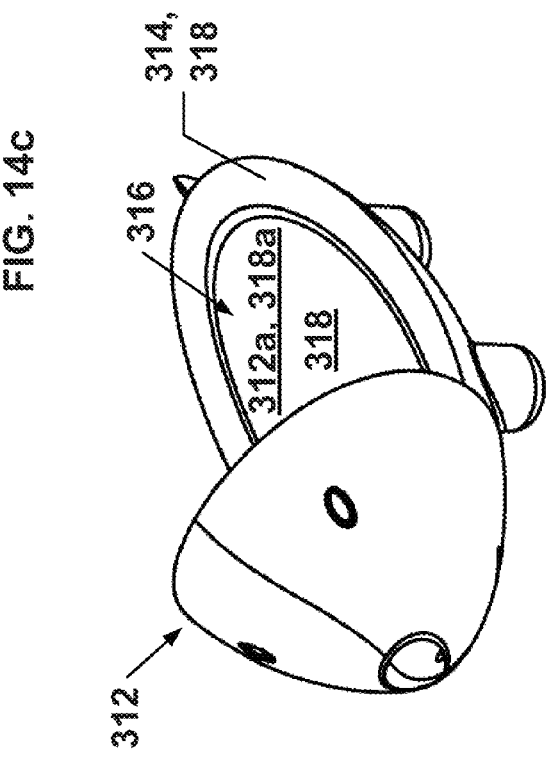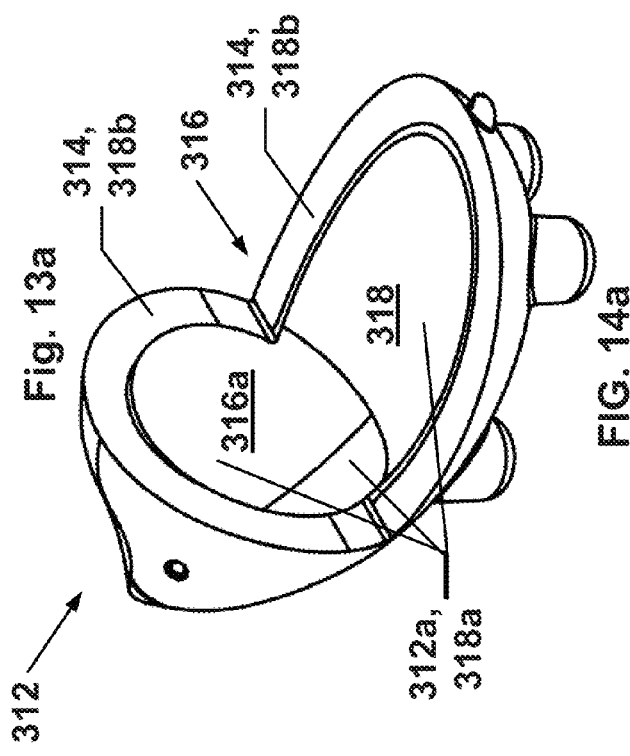
Fig. 13a
FIG. 14a
FIG. 14b
FIG. 14c

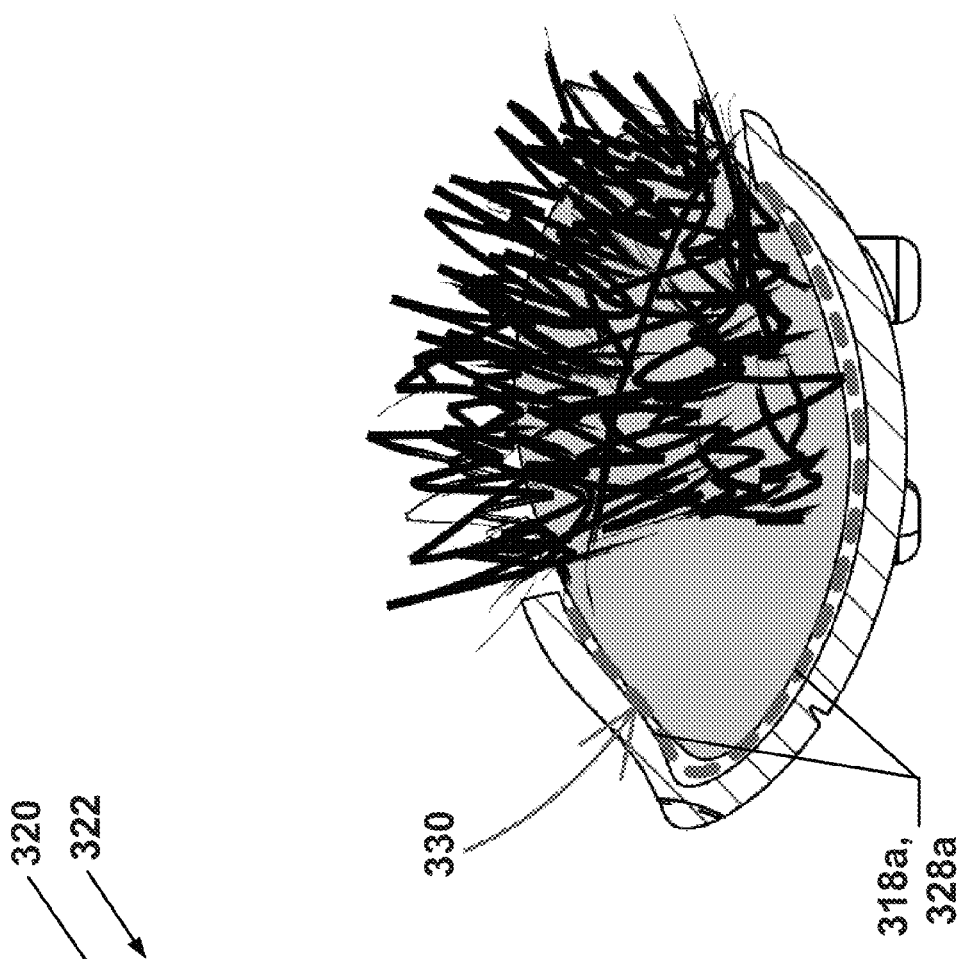
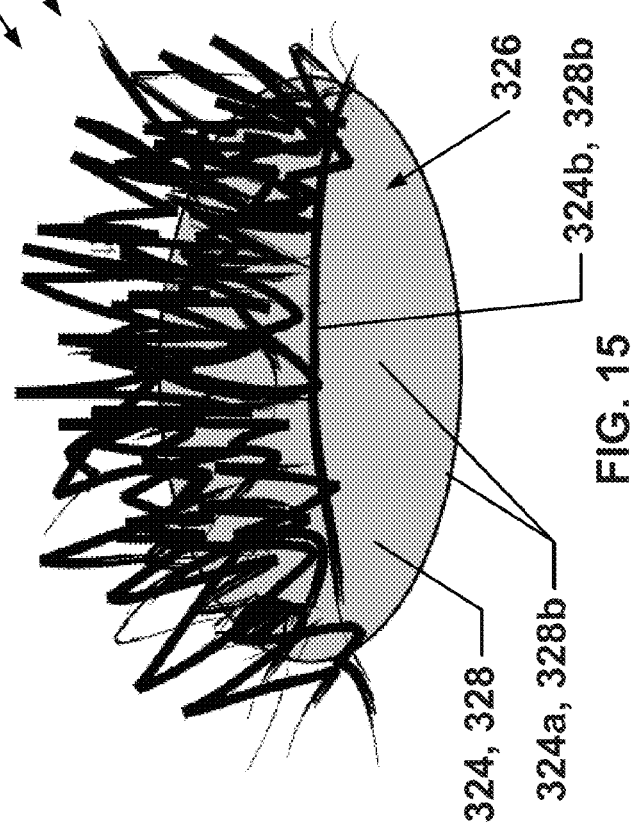

US 9,021,990 B2

PET TOY AND METHOD OF MAKING A PET TOY

CROSS-REFERENCE TO RELATED APPLICATIONS

This application is a continuation-in-part of and claims priority to U.S. Ser. No. 12/877,320, filed Sep. 8, 2010, which is pending and which is incorporated hereby in its entirety for all purposes.

U.S. Ser. No. 12/877,320 is a non-provisional counterpart to and claims priority from U.S. Ser. No. 61/301,728, filed Feb. 5, 2010, which is incorporated hereby in its entirety for all purposes.

This application is a non-provisional counterpart to and claims priority from U.S. Ser. No. 61/370,917, filed Aug. 5, 2010, which is pending and which is incorporated hereby in its entirety for all purposes.

BACKGROUND OF THE INVENTION

1. Field of the Invention

The invention relates to one or more pet toys having at least two different materials.

2. Discussion of the Related Art

Pets such as dogs and cats, are naturally curious; yet, to keep pets interested in toys an attractant is incorporated in the toy. One of the most common attractant is a sound-producing member, especially a squeaker.

Squeakers create interest in pet toys but produce a sharp, sudden sound that some pet owners find unpleasant. Mounting a squeaker may be a laborious and costly production step. That step is often for nil as certain aggressive pets seek out the squeaker and attempt to bite it from the toy. Once the squeaker is removed, the toys attractiveness is changed.

What is desired is a toy having an attractant that is easily and economically replaceable. It is also desired that the toy may be produced economically.

Moreover, pets, especially dogs, experience pet toys through the feel of the toy in the pet's mouth. Thus, pets are sensitive to the texture and the materials of the toy, i.e., the mouth-feel of the toy.

Typically, pet toys are made of one kind of material. The material affects the experience the toy for the pet. For example, pet toys made solely vinyl provide a smooth feel unless heavily textured and having little bite resistance, while a rubber toy may provide significant bit resistance. A toy made solely of plush material provides a rougher and uneven texture, but providing little bite resistance.

Attempts to make a toy incorporating material having a different mouth-feel depending on how they are taken into the mouth of the pet has been difficult and expensive.

Thus, what is needed is a simplified toy structure and method to provide a multi-material pet toy having multiple mouth-feel experience for a pet.

SUMMARY OF THE INVENTION

These and other needs are met by the present invention. Therein, a multi-material pet toy includes at least a sound-producing member made of a first material that preferably is blow-moldable and a second, protective, member comprising a second material that lengthens the serviceable life of the first material so that the serviceable life of the multi-material pet toy is also lengthened.

A multi-material pet toy is usable by a pet, such as a dog, for enjoyment and entertainment. The multi-material pet toy comprises one or more first material body portions and one or more second material body portions that are secured respectively to the first material portions at one or more connecting portions present on each material portion.

Each of the material portions comprises a mouth-feel, i.e., a feel in the mouth of the pet, that is substantially different than another material portion. This provides an interest in the pet to play longer with the toy.

BRIEF DESCRIPTION OF THE DRAWINGS

FIG. 1a is a perspective view of a multi-material pet toy in accordance with one or more embodiments of the present invention.

FIG. 1b is a cross-sectional view of the multi-material pet toy of FIG. 1a.

FIG. 1c is a schematic view of the use of the multi-material pet toy of FIG. 1a.

FIG. 2a is a perspective view of a multi-material pet toy in accordance with one or more embodiments of the present invention.

FIG. 2b is a cross-sectional view of the multi-material pet toy of FIG. 2a.

FIG. 2c is a schematic view of the use of the multi-material pet toy of FIG. 2a.

FIG. 3a is a perspective view of a multi-material pet toy in accordance with one or more embodiments of the present invention.

FIG. 3b is a cross-sectional view of the multi-material pet toy of FIG. 3a.

FIG. 3c is a schematic view of the use of the multi-material pet toy of FIG. 3a.

FIG. 4b is an exploded cross-sectional view of the multi-material pet toy of FIG. 4a.

FIG. 4c is a cross-sectional view of the multi-material pet toy of FIG. 4a.

FIG. 4d is a cross-sectional view of the multi-material pet toy of FIG. 4a more clearly illustrating that the sound producing member and sleeve are held without play to provide an intimate adjacent contact.

FIG. 4e is a perspective view of a sound-producing member in an open condition in accordance with one or more embodiments of the present invention.

FIG. 4f is a perspective view of the sound-producing member of FIG. 4e wherein the sound producing member has been closed with a seal.

FIG. 4g is a perspective view of a mold for making the seal of the sound-producing member of FIG. 4f in accordance with one or more embodiments of the present invention.

FIG. 4i is an exploded view of a sound producing member with a stabilizing cap shown in cross-section in accordance with one or more embodiments of the present invention.

FIG. 4j is a further view of the sound producing member with a stabilizing cap shown in cross-section of FIG. 4i.

FIG. 4h is a partial cross-sectional view of the sound producing member and a seal.

FIG. 5a is an exploded perspective view of a multi-material pet toy in accordance with one or more embodiments of the present invention.

FIG. 5b is a cross-sectional view of the multi-material pet toy of FIG. 5a.

FIG. 5c is a perspective view of a cross-section of a multi-material pet toy in accordance with one or more embodiments of the present invention.

FIG. 5*d* is a cross-sectional view of the multi-material pet toy of FIG. 5*c*.

FIG. 5*e* is a perspective view of a cross-section of a multi-material pet toy in accordance with one or more embodiments of the present invention.

FIG. 5*f* is a cross-sectional view of the multi-material pet toy of FIG. 5*e*.

FIG. 6*a* is a perspective view of a sound-producing member of a multi-material pet toy in accordance with one or more embodiments of the present invention.

FIG. 6*b* is a partial cross-sectional view of a multi-material pet toy having the sound-producing member of FIG. 6*a*.

FIG. 6*c* is a partial perspective cross-sectional view of a multi-material pet toy having the sound-producing member of FIG. 6*a*.

FIG. 7*a* is a perspective view of a multi-material pet toy in accordance with one or more embodiments of the present invention.

FIG. 7*b* is a front view of the multi-material pet toy of FIG. 7*a*.

FIG. 7*c* is a cross-sectional view of the multi-material pet toy of FIG. 7*a*.

FIG. 8*a* is a front view of a multi-material pet toy in accordance with one or more embodiments of the present invention.

FIG. 8*b* is a view of the use of the multi-material pet toy of FIG. 8*a*.

FIG. 8*c* is a perspective view of the multi-material pet toy of FIG. 8*a*.

FIG. 9*a* is a front view of a multi-material pet toy in accordance with one or more embodiments of the present invention.

FIG. 9*b* is a perspective view of the multi-material pet toy of FIG. 9*a*.

FIG. 10 is front view of a multi-material pet toy in accordance with one or more embodiments of the present invention.

FIGS. 11*a* and 11*b* are a perspective view of a fixture making a multi-material pet toy in accordance with one or more embodiments of the present invention.

FIG. 12*a* is a schematic view of a pet toy in accordance with one or more embodiments of the present invention.

FIG. 12*b* is a second schematic view of the pet toy of FIG. 12*a*.

FIG. 12*c* is a schematic view of a pet toy in accordance with one or more embodiments of the present invention.

FIG. 12*d* is a second schematic view of the pet toy of FIG. 12*c*.

FIG. 13*a* is a side view of a multi-material pet toy in accordance with one or more embodiments of the present invention.

FIG. 13*b* is a cross-sectional view of the toy of FIG. 13*a* in accordance with one or more embodiments of the present invention.

FIG. 14*a* is rear perspective view of a first material portion of the toy in FIG. 13*a* in accordance with one or more embodiments of the present invention.

FIG. 14*b* is a front perspective view of a first material portion of the toy in FIG. 13*a* in accordance with one or more embodiments of the present invention.

FIG. 14*c* is a cross-sectional view of a first material portion of the toy in FIG. 13*a* in accordance with one or more embodiments of the present invention.

FIG. 15 is a side view of a second material portion of the toy of FIG. 13*a* in accordance with one or more embodiments of the present invention.

DETAILED DESCRIPTION OF THE INVENTION

Figure 4B:
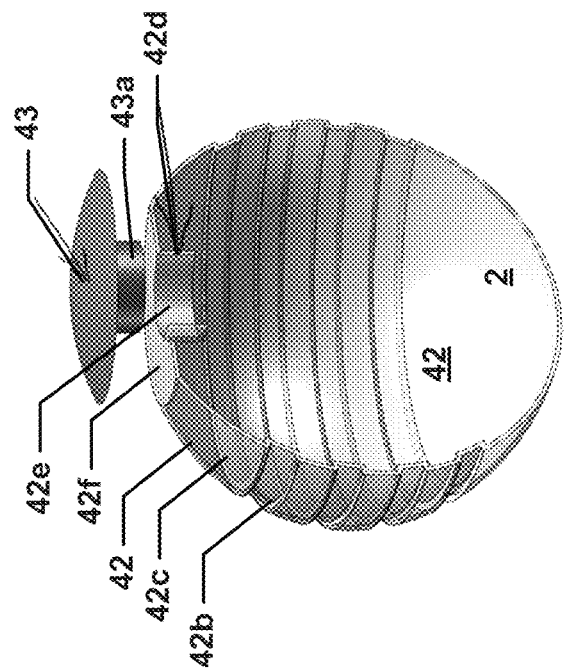

Reference will now be made in detail to several views of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

In accordance with one or more embodiments of the present invention, a multi-material pet toy is suitable for playing by a pet, such as a dog. The multi-material pet toy includes at least a first member that comprises an attractant that makes the multi-material pet toy interesting to pets and a second member that preferably lengthens the serviceable life of the first member due to the material from which it is made so that the serviceable life of the multi-material pet toy is also lengthened. An attractant may be a sound-producing material, a sound-producing member, and/or a sound-producing structure; and/or a mouth-feel material, a mouth-feel member, and/or mouth-feel structure that alone or in combination with the material of the second member produces a feeling in the pet's mouth that encourages the pet to play with the multi-material pet toy.

In accordance with one or more embodiments of the present invention, the multi-material pet toy includes at least a sound-producing member made of a first material 2 that preferably is blow-moldable and a second, protective, member comprising a second material 4 that lengthens the serviceable life of the first material so that the serviceable life of the multi-material pet toy is also lengthened.

The toy includes a sound-producing member that is functional as an attractant to pets, such as dogs, and that provides significant advantages over sound-producing members or other attractants known in the art. First, it does not rely on air movement through the sound-producing member and, thus, does not emit sudden high-pitched squeaks as are common to squeakers. Second, the sound-producing member when engaged by an animal make a sound having a crinkling, crackling, and/or rustling characteristic that is of greater and longer lasting interest by animals, especially dogs. Third, the volume and resonance of the sound of the sound-producing member when engaged by animal is deeper and less intrusive than sounds produced by reed-based squeakers. Fourth, the sound-producing member that is either freely available or is economical to produce, and, thus, easily replaceable when damaged. Fifth, when both the sound-producing member and the protective member are exposed, the difference in material between the two members additionally provides an attraction to pets due to the different textures and giving a particular contrasting or complementary mouth-feel.

Moreover, using a second protective member provides that when the sound producing member is damaged, pieces of the sound-producing member are preferably retained within the second member.

The first material may be a blow-moldable material that which when chewed or played with by a dog or other animal makes a sound having a crinkling, crackling, and/or rustling characteristic. When objects having crinkling, crackling, and/or rustling noise characteristic are handled or engaged by animals, such as dogs, the crinkling, crackling, and/or rustling noise characteristics enhance interest in the object and lengthen the interaction with the object, possibly because it resembles prey animals rustling through leaves and evokes a chasing and/or hunting instinct in dogs.

The sound-producing member is preferably sealed with a cap or others suitable closure and retains at least ambient pressure within the sound-producing member to prevent the sound-producing member from collapsing when chewed or otherwise engaged by the pet. The sound-producing member may also be filled with air or any kind of a fillable material, which may be a fibrous or shredded polymer, beyond ambient pressure, i.e., in range from 1 atmosphere to 3.0 atmosphere, preferably in a range 1.2 to 1.5 atmosphere, to provide greater stability of the sound producing member, resistance, and playability for the toy.

Preferably, first material 2 is a thermoplastic polymer resin as are commonly used in beverage, food, and other types of containers and/or plastic wrap that have a crinkling, crackling, and/or rustling characteristic and, are preferably, thermoformable, such polyethylene terephthalate, i.e., "PET." However, first material 2 may also be high density polyethylene (HDPE), low density polyethylene (LDPE), polyethylene terephthalate: polyvinyl chloride, polypropylene, polystyrene fluorine treated HDPE, post consumer resin (PCR), or K-resin SBC.

Preferably, the second material 4 is a protective material that material that lengthens the serviceable life of the first material so that the serviceable life of the multi-material pet toy is also lengthened. The second material may be a vinyl, natural and/or synthetic rubber, and/or any other type of elastomeric material or materials. The second material is preferably moldable material and may also be overmolded as taught further herein. The second material preferably also has a hot-tear resistance suitable for inserting the member made of the first material, but not tearing.

In addition to the first and second materials, other materials are also intended to be incorporated to add interest or challenge to the multi-material pet toy and/or act to alter, enhance, and/or change the sound and/or other quality of the sound producing material.

FIG. 1a is a perspective view of a multi-material pet toy in accordance with one or more embodiments of the present invention. FIG. 1b is a cross-sectional view of the multi-material pet toy of FIG. 1a. FIG. 1c is a schematic view of the use of the multi-material pet toy of FIG. 1a. In accordance with one or more embodiments of the present invention, a multi-material pet toy 10 comprises a sound-producing member 12 and a sleeve 14 for removably receiving sound-producing member 12.

Sound-producing member 12 comprises first material 2 and may be in the form of a bottle 12a. A bottle cap 13 remains affixed to bottle 12a to maintain at least ambient pressure within the sound-producing member to prevent the sound-producing member from collapsing when chewed or otherwise engaged by the pet. The sound-producing member may also be filled beyond ambient pressure, i.e., in range from 1 atmosphere to 3.0 atmosphere, preferably in a range 1.2 to 1.5 atmosphere, to provide greater resistance and playability for the toy.

The closure of the sound-producing member also provides a low resonance of the sound-producing member. Cap 13 may be made of a different or like material as material 2.

Bottle 12a and cap 13 may be any bottle typically used in commerce for the sale and/or use of water, soda, juice et al., such a bottle may be one as shown in U.S. Pat. Nos. D591,610 or D419,882, which are hereby incorporated by reference. Typically, such bottles include an ergonomic portion.

In use, when a pet chews on or plays with sound-producing member 12, sound-producing member 12 makes a sound having a crinkling, crackling, and/or rustling characteristic. However, due to the thin wall construction of bottle 12a, the bottle, i.e., sound-producing member 12 becomes easily damaged.

To prolong its service life as a pet toy, sound-producing member 12 is removably insertable into sleeve 14; therein, preferably the sound-producing member is inserted so that cap 13 is inserted first into sleeve 14. Sleeve 14 resists tearing and reduces damage to sound-producing member 12, while at the same time permitting the crinkling, crackling, and/or rustling noise characteristics of sound-producing member 12 to be audible by the pet without undue sound deadening.

Sleeve 14 comprises second material 4, and preferably is molded of natural rubber and/or other elastomeric material that is suitably stretchable to removably receive sound-producing member 12. Sleeve 14 includes a body 14a of any shape, such as the illustrated oblong body, having an inner space 14b to suitable retain sound-producing member 12 without play.

The body comprises a closed end 14c and open end 14d that receives sound-producing member 12. A retaining rim 14e is formed to retain sound-producing member 12 in sleeve 14 and retaining rim 14e forms a periphery defining opening 14f.

Preferably, body 14a has a cylindrical outer shape and a cylindrical inner shape to accommodate bottle 12a without necessarily comprising an inner contoured surface that mates with the exact shape of bottle 12a and/or cap 13.

To accommodate a standard water 16.9 fluid ounce water bottle, sleeve 14 may comprise a length of 8.5 inches from closed end to open end as measured on the exterior of sleeve 14, a diameter of 2.8 inches as measured on the exterior of sleeve 14, and a wall thickness of 3-9 mm depending on the size and aggressiveness of the intended dog. Opening 14f may have a diameter of 2.0 inches.

Sleeve 14 may be sold in commerce by itself with instructions for a pet owner to utilize a used, empty water or soda bottle 12a. Thus, the owner would then insert the bottle via opening 14d into the sleeve until the cap is disposed against the closed end and/or the retaining rim holds the bottle in place.

When the sound-producing member has been damaged, the owner may remove the damaged bottle by pulling it through the opening 14f and insert a new replacement bottle. Advantageously, sleeve 14 retains the damaged first member 12 in the sleeve and, thus, avoids creating a mess.

In commerce, sleeve 14 may be sold in various sizes for use with various size bottles and the same size sleeve may be sold in varying wall thicknesses to accommodate dogs of various sizes and bite aggressiveness.

In commerce, sleeve 14 may sold in a kit with polyfill of any suitable kind and instructions to insert the polyfill in the sound-producing member to increase the various sound properties, especially to produce a deeper and richer sound. In addition or instead, the polyfill material preferably serves to stabilize the inner space of the sound producing member to prevent collapse of the sound producing member. Rather than using a polyfill material, any other suitable material may be used instead of polyfill material for the same purposes.

FIG. 2a is a perspective view of a multi-material pet toy in accordance with one or more embodiments of the present invention. FIG. 2b is a cross-sectional view of the multi-material pet toy of FIG. 2a. FIG. 2c is a schematic view of the use of the multi-material pet toy of FIG. 2a. In accordance with one or more embodiments of the present invention, a multi-material pet toy 20 is configured similarly to multi-material pet toy 10, but includes further improvements. Therein, multi-material pet toy 20 comprises a sound-producing member 22 and a sleeve 24 for removably receiving sound-producing member 22.

Sound-producing member 22 may be configured similarly to sound-producing member 12 and, thus, comprises first material 2, which may be in the form of a bottle 22a, and a bottle cap 23 affixed to bottle 22a. Cap 23 may be made of a different or like material as material 2.

In use, when a pet chews on or plays with sound-producing member 22, sound-producing member 22 makes a sound having a crinkling, crackling, and/or rustling characteristic. However, due to the thin wall construction of bottle 22a, the bottle, i.e., sound-producing member 22 becomes easily damaged.

To prolong its service life as a pet toy, sound-producing member 22 is removably insertable into sleeve 24; therein, preferably the sound-producing member is inserted so that the cap is inserted first into the sleeve. Sleeve 24 resists tearing and reduces damage to sound-producing member 22, while at the same time permitting the crinkling, crackling, and/or rustling noise characteristics of sound-producing member 22 to be audible by the pet without undue sound deadening.

Sleeve 24 comprises second material 4, and preferably is molded of natural rubber and/or other elastomeric material that is suitably stretchable to receive sound-producing member 22. Sleeve 24 includes a body of any shape, such as the illustrated oblong buoy-style body 24a, having an inner space 24b to suitable retain sound-producing member 22 without play. The body comprises a tip portion 24c having a closed end 24d having a rounded conical shape and a bottom portion 24e having an open end 24f that receives sound-producing member 22.

A retaining rim 24g is formed and one or more flaps 24h extend from the retaining ring. The retaining ring and one or more flaps retain sound-producing member 22 in sleeve 24. The one or more flaps are able to be flexibly folded during insertion or removal of sound-producing member 22.

To aid in handling sleeve 24, a grip portion 24i, which may be in any form such as a ring that is preferably integral with the sleeve. When a used sound-producing member 22 is to be removed by the user, the user grabs the ring and removes it by pulling on the grip portion.

Since body 24a may deaden the sound, body 24a comprises one or more apertures 24j that reduce sound deadening. Preferably, apertures 24j are oval in shape to provide an attractive appearance and arranged in one or more groupings 24k comprising one or more apertures 24j of varying sizes. Each grouping 24k may be disposed on approximately one fourth of the outer surface in a longitudinal arrangement from tip portion to bottom portion and be spaced-apart from another grouping so that the toy comprises portions where the animal can have direct contact with sound-producing member 22 and feel an interaction.

Sleeve 24 may be similarly sized as sleeve 14 and have a similar wall thickness. Sleeve 24 may be sold in commerce by itself with instructions for a pet owner to utilize a used, empty water or soda bottle 22a. Thus, the owner would then insert the bottle via open end 24f into the sleeve until the cap is disposed against the closed end and/or the retaining rim holds the bottle in place.

When the sound-producing member has been damaged, the owner may remove the damaged bottle by pulling it through open end 24f and insert a new replacement bottle.

In commerce, sleeve 24 may be sold in various sizes for use with various size bottles and the same size sleeve may be sold in varying wall thicknesses to accommodate dogs of various sizes and bite aggressiveness. Advantageously, the one or more apertures also permit a purchaser of the multi-material pet toy to see the sound-producing member or a representation of the sound-producing member grasp the intended use of the toy when considering the purchase.

In one embodiment, substantially all of sleeve 24 excluding the tip portion and bottom portion includes one or more apertures 24h.

FIG. 3a is a perspective view of a multi-material pet toy in accordance with one or more embodiments of the present invention. FIG. 3b is a cross-sectional view of the multi-material pet toy of FIG. 3a. FIG. 3c is a schematic view of the use of the multi-material pet toy of FIG. 3a. In accordance with one or more embodiments of the present invention, a multi-material pet toy 30 is configured similarly to multi-material pet toy 10, but includes further improvements. Therein, multi-material pet toy 30 comprises a sound-producing member 32 and a sleeve 34 for removably receiving sound-producing member 32

Sound-producing member 32 may be configured similarly to sound-producing member 12 and, thus, comprises first material 2, which may be in the form of a bottle 32a and a bottle cap 33 affixed to bottle 32a. Cap 33 may be made of a different or like material as material 2.

Sleeve 34 comprises second material 4, and preferably is molded of natural rubber and/or other elastomeric material that is suitably stretchable to receive sound-producing member 32. Sleeve 34 includes a body of any shape, such as the illustrated oblong body 34a, having an inner space 34b to suitable retain sound-producing member 32 without play. The body comprises a top portion 34c having a closed end and a bottom portion 34d having closed end or an open end as taught.

The body comprises a longitudinal slot 34e having lip portions 34f that are slightly spaced-apart for easier grasping by a user and cutouts 34g that prevent tearing of the slot. The sound-producing member 22 is inserted through the slot into inner space 34b.

Since body 34a may deaden the sound, body 34a comprises one or more apertures such as apertures 24j that reduce sound deadening and are grouped together as taught above.

Sleeve 34 may be similarly sized as sleeve 14 and have a similar wall thickness. Sleeve 34 may be sold in commerce by itself with instructions for a pet owner to utilize a used, empty water or soda bottle 32a. Thus, the owner would then insert the bottle via slot 34e into the sleeve until the cap is disposed securely in the sleeve; therein, preferably the sound-producing member is inserted so that the cap is inserted first into the sleeve.

When the sound-producing member has been damaged, the owner may remove the damaged bottle by pulling it through the slot and insert a new replacement bottle.

In commerce, sleeve 34 may be sold in various sizes for use with various size bottles and the same size sleeve may be sold in varying wall thicknesses to accommodate dogs of various sizes and bite aggressiveness. Advantageously, the one or more apertures also permit a purchaser of the multi-material pet toy to see the sound-producing member or a representation of the sound-producing member grasp the intended use of the toy when considering the purchase.

Figure 4A:
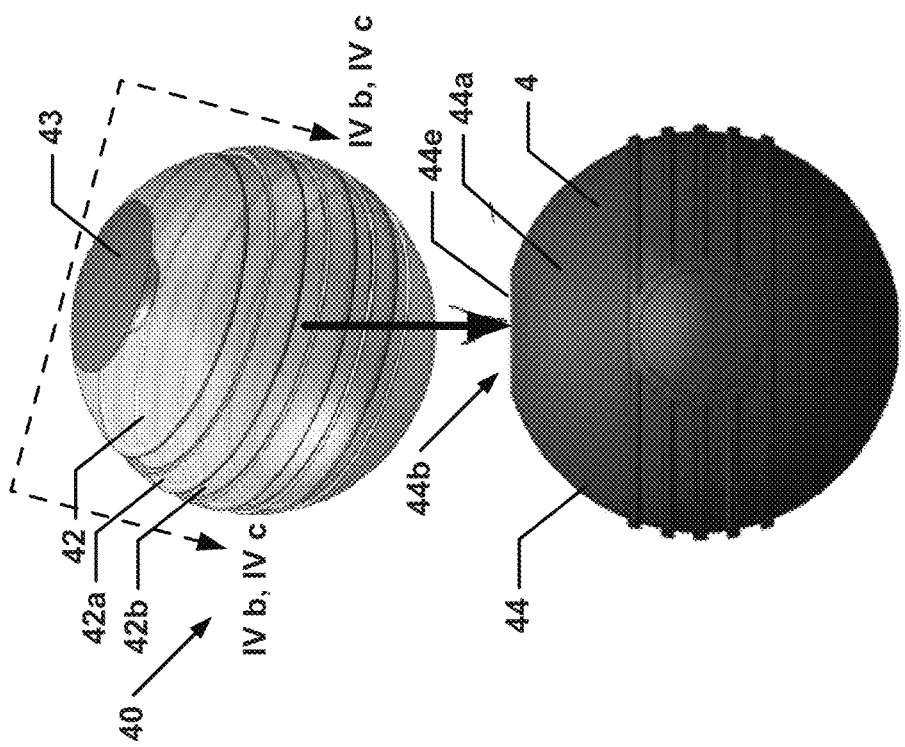
FIG. 4a is an exploded perspective view of a multi-material pet toy in accordance with one or more embodiments of the present invention.

FIG. 4a is an exploded perspective view of a multi-material pet toy in accordance with one or more embodiments of the present invention. FIG. 4b is an exploded cross-sectional view of the multi-material pet toy of FIG. 4a. FIG. 4c is a cross-sectional view of the multi-material pet toy of FIG. 4a. FIG. 4d is a cross-sectional view of the multi-material pet toy of FIG. 4a more clearly illustrating that the sound producing member and sleeve are held without play to provide an intimate adjacent contact.

In accordance with one or more embodiments of the present invention, a multi-material pet toy 40 comprises a sound-producing member 42 and a sleeve 44 that receives sound-producing member 42.

Sound-producing member 42 comprises first material 2, which may be in any suitable shape having a body 42a and a cap 43 affixed to the body to seal the sound-producing member 42. Cap 43 may be made of a different or like material as material 2. By sealing the sound-producing member, the volume of noise originating from the sound-producing member is lessened and the crinkling, crackling, and/or rustling noise characteristic is placed in the lower range increasing the attractive quality for animals and making the toy more pleasant for the animal's owner.

Preferably, sound-producing member 42 includes one or more retention structures 42b having any suitable shape to retain the sound-producing member in the same position relative to the sleeve. The one or more retention structures 42b may comprise one or more partial or complete circumferential bands that are indented or extended relative to a surface 42c of the sound-producing member.

Preferably, cap 43 comprises an extension 43a that is received in a sleeve 42d defining an aperture 42e in a flattened top portion 42f of the body of the sound-producing member. During manufacture cap 43 is preferably glued onto top portion 42f trapping ambient air at ambient pressure in the body of the sound-producing member.

Sleeve 44 comprises second material 4, and preferably is molded of natural rubber and/or other elastomeric material that is suitably stretchable to receive sound-producing member 42. Sleeve 44 includes a body of any shape, such as the illustrated rounded body 44a, having an inner space 44b to suitably retain sound-producing member 42 without play.

To aid in retention of sound-producing member 42, an inner surface 44c of body 44a comprises one or more respective retention structures 44d that mate with one or more retention structures 42b to hold the sound-producing member in the same position relative to the sleeve, e.g., hold the sleeve sound-producing member stationary relative to the sound-producing member.

FIG. 4d is a cross-sectional view of the multi-material pet toy of FIG. 4a. FIG. 4d more clearly illustrates that sound producing member 42 and sleeve 44 are held without play to provide an intimate adjacent contact between surface 42c of the exterior of inner surface 44c of the sleeve 44.

The body comprises an open portion 44e that preferably is smaller than cap 43 so that the cap is maintained safely below an edge of the open portion. However, the cap may also be smaller than the opening for ease of assembly and/or durability of the sound-producing member. Preferably, the second material has sufficient hot tear resistance to permit stretching to insert the sound-producing member and subsequent return to a smaller state wherein open portion 44e is smaller than cap 43.

However, even more preferably, second material 4 comprises the ability to stretch even when not hot in order to remove a damaged and/or used sound-producing member and insert a new sound-producing member and the material's subsequent return to a smaller state wherein open portion 44e is smaller than cap 43.

When the sound-producing member has been damaged, the owner may remove the damaged bottle by pulling it through open end 24f and insert a new replacement bottle.

In commerce, multi-material pet toy 40 may be sold in various sizes and with varying wall thicknesses of sleeve 44 to accommodate dogs of various sizes and bite aggressiveness.

FIG. 4e is a perspective view of a sound-producing member in an open condition in accordance with one or more embodiments of the present invention. FIG. 4f is a perspective view of the sound-producing member of FIG. 4e wherein the sound producing member has been closed with a seal. FIG. 4g is a perspective view of a mold for making the seal of the sound-producing member of FIG. 4f in accordance with one or more embodiments of the present invention. FIG. 4h is a partial cross-sectional view of the sound producing member and a seal.

In accordance with one or more embodiments of the present invention, a multi-material pet toy, such as toy 40, comprises a sound producing member 142 and a sleeve that receives sound producing member 142. The sleeve may be any sleeve such as sleeve 44, 54, et al. which are discussed below. Sound producing member 142 may also be used a pet toy by itself without any sleeve or may be incorporated with toys 140a and 140b.

Sound-producing member 142 comprises first material 2, which may be in any suitable shape having a body 142a and an opening 142b of a suitable size that provides access to an interior of sound producing member 142. Although, body 142a may be smooth, body 142a may also comprise one or more retention structures 142c being formed preferably but not necessarily of ridges and/or one or more grooves so that the sound producing member and sleeve are held preferably without play to provide an intimate adjacent contact. Body 142a may also comprise one or more bands 142d and/or designs 142e for artistic value.

A seal 143 is affixed to the body to seal the sound-producing member 142. Seal 143 preferably comprises a thermoplastic material that may be melted and maintains a suitable viscosity when heated to temperatures preferably between 250-380 F. The viscosity may also be suitable when the thermoplastic material is fluid enough to flow into the interior space of sound producing member through opening 142b.

Therein, seal 143 preferably serves to stabilize the inner space of the sound producing member to prevent collapse of the sound producing member by retaining air to act as a counterforce when the sound producing member is being compressed such as by a bite. Thus, the life of the sound producing member is extended.

For example, seal 143 comprises a hot melt adhesive having the requisite properties and is non-toxic. However, most preferably, seal 143 consists of hot melt adhesive by itself and/or consists of hot melt adhesive plus a minimal amount of coloring agent to match and/or contrast the color of body 142a.

Seal 143 is preferably made by using a mold 145. In a first step, a predetermined amount of thermoplastic material is placed in well 145a of mold 145. Mold 145 may be any suitable mold and, therein, may have one or more walls 145b that retain sound producing member 142 suitably in the mold until seal 143 is formed. Well 145a may have a suitable design and/or indications 145c that match, cooperate, and/or enhance one or more designs 142f in order to give a more polished appearance and hide seal 143 on body 142a and/or make seal 143 stand out on body 142a.

The mold may be heated or may generate heat through one or more heating elements to heat the thermoplastic material to the suitable temperature needed for the subsequent steps. In the alternative, the thermoplastic material that is placed in well 145a may already be heated and be in a suitably viscous state when it is placed in well 145. Therein, a combination of a mold having the ability to heat the thermoplastic material and the thermoplastic material being heated prior to being placed in well 145a.

Once the thermoplastic material is heated, in a second step, sound producing member 142 is disposed into the mold such that 142b is most proximal to well 145a. In order that sound producing member 142 is properly located one or more ridges and/or one or more grooves 142c may be disposed against one or more corresponding grooves and/or ridges, respectively, located in one or more walls 145b of the mold. Therein, preferably, opening 142b is spaced apart a predetermined distance from the surface of well 145a.

In a third step, a suitable pressure is applied to sound producing member 142 to maintain sound producing member 142 in the mold and permit the thermoplastic material to enter opening 142b. Since opening 142b is spaced apart a predetermined distance from the surface of well 145a, the thermoplastic material also covers a predetermined area proximal to opening 142b.

In a fourth step, the thermoplastic material is permitted to cool and solidify at least partially to form seal 143 of sound producing member 142. Therein, mold 145 may comprise a cooling system, or the mold and the sound producing member are moved to a location that speeds up cooling.

In a fifth step, sound producing member 142 is removed from mold 145. By sealing the sound-producing member, the volume of noise originating from the sound-producing member is lessened and the crinkling, crackling, and/or rustling noise characteristic is placed in the lower range increasing the attractive quality for animals and making the toy more pleasant for the animal's owner. Preferably, seal 143 traps ambient air at ambient pressure in the body of the sound-producing member.

Seal 143 has the distinct advantage of being easily made, not requiring tolerancing of the sound producing member so that a cap will fit, is unitary and preferably is flexible. Because the seal is fluid when formed, seal 143 grasps both sides of the peripheral edge of the wall and thus is unitary as illustrated in FIG. 4h.

When chewed on by a pet such as a dog is known through empirical evidence to last much longer than a cap and remain seated much longer than a cap. Moreover, seal 143 provides an air tight sealing of the interior space of the sound producing member with respect to the ambient environment.

As noted, sound producing member 142 may also be used a pet toy by itself without any sleeve or may be incorporated with toys 150 and 160. Sound producing member 142 may also be incorporated into a plush toy.

FIG. 4i is an exploded view of a sound producing member with a stabilizing cap shown in cross-section in accordance with one or more embodiments of the present invention. FIG. 4j is a further view of the sound producing member with a stabilizing cap shown in cross-section of FIG. 4i.

Therein, a sound producing member 192 comprises a stabilizing cap 193 that provides an air tight sealing of the interior space of the sound producing member with respect to the ambient environment. Sound producing member 192 may be substantially identical to any one or any combination of sound producing members taught herein. Therein, sound producing member 192 is preferably made material 2. In addition and/or instead thereof, sound producing member 192 comprises a lower portion 192a having one or more wall portions including a wall portion 192b. Wall portion 192b may be curved, partially spheroid, and/or a combination thereof. A further wall portion, a deck 192c is substantially planar and with wall portion 192b substantially defines an interior space of the sound producing member. A throat 192d is disposed substantially perpendicular to deck 192c and s preferably cylindrical to operatively accommodate a thread 192e, as is generally known in the art.

Stabilizing cap 193 comprises a substantially curved surface 193a that preferably when cap 193 is joined to the one or more wall portions forms a ball. Cap 193 preferably includes an inner wall 193a that fits inside the throat and an outer wall 193b that fits on the exterior and comprises threads 193c that engage threads 192e as is generally known in the art. Cap 193 may be made without inner wall 193a. However, advantageously, when cap 193 includes inner wall 193a air contained in the inner space is less likely to leak than when inner wall 193 is omitted.

Cap 193 may also be press-fit on throat 192d and therein rather than or in addition to threads 192e and/or 193c, mechanical interlocking structures may be present on cap 193 and/or throat 192c.

When cap 193 is secured, a peripheral edge 193d is preferably disposed adjacent to deck 192c without play. Therein, when an animal chews on the sound producing member, the force placed on cap 193 is transferred to edge 193d and because the spaced between the cap and the deck is minimal is transferred to the lower portion of the sound producing member.

Cap 193 is preferably 8.8 mm tall along a radial line from a center of the sound producing member and the distance from the deck to a furthest most point on lower portion and passing through a center of the sound producing member is 42 mm. Thus, the ration of the cap's height to the lower portion is approximately 1:4.7; however ratios are preferably in the range of 1:4 to 1:5.5 for cap to lower portion radial dimension.

FIG. 12a is a schematic view of a pet toy in accordance with one or more embodiments of the present invention. FIG. 12b is a second schematic view of the pet toy of FIG. 12a. FIG. 12c is a schematic view of a pet toy in accordance with one or more embodiments of the present invention. FIG. 12d is a second schematic view of the pet toy of FIG. 12c. Therein, a pet toy 170a or 170b comprises sound producing member 172 and a body 174 that receives sound producing member 172. Sound producing member 172 may be identical or similar to sound producing member 142 but may also be advantageously configured substantially similar to other sound producing members taught herein. Sound producing member 172 is preferably disposed in a portion of the body that is easily accessible to the pet via biting. For example, sound producing member 172 may be disposed in a head portion of body 174. Body 174 is preferably made of mouth-feel material and the sound producing member is preferably sewn into the head as generally known in the art. The mouth-feel material may be a plush fabric material as depicted in pet toy 170*a*, a canvass material as depicted in pet toy 170*b*, fur or fur-like material, a canvass lined with rubber material, and/or any other suitable material having a texture that produces a mouth-feel in the pet. Additionally, the mouth-feel material is also preferably pleasing to a shopper and/or the pet owner. The plush fabric material may be any suitable plush fabric material having any suitable deep or low pile or in between, fabric count, and be made of natural or synthetic material; but preferably are deep pile such that the pile for a superior mouth-feel. The fur or fur-like material may be natural or synthetic, and may comprise any length of fiber/hair length.

FIG. 5*a* is an exploded perspective view of a multi-material pet toy in accordance with one or more embodiments of the present invention. FIG. 5*b* is a cross-sectional view of the multi-material pet toy of FIG. 5*a*. In accordance with one or more embodiments of the present invention, a multi-material pet toy 50 similar to multi-material pet toy 40. Thus, multi-material pet toy 50 comprises a sound-producing member 52 and a sleeve 54 that receives sound-producing member 52.

However, sleeve body 54*a* comprises one or more apertures such as apertures 54*f* that reduce sound deadening and are grouped together as taught above. Preferably, apertures 54*f* are preferably circular or oval in shape to provide an attractive appearance and may be arranged in one or more groupings comprising one or more apertures of varying sizes.

Each grouping may be disposed on approximately one fourth of the outer surface so that the toy comprises portions where the animal can have direct contact with sound-producing member 52 and feel an interaction.

Advantageously, the one or more apertures also permit a purchaser of the multi-material pet toy to see the sound-producing member and grasp the intended use of the toy when considering the purchase.

FIG. 5*c* is a perspective view of a cross-section of a multi-material pet toy in accordance with one or more embodiments of the present invention. FIG. 5*d* is a cross-sectional view of the multi-material pet toy of FIG. 5*c*. A pet toy 150 may be similar to pet toy 50. Pet toy 150 comprises a sound producing member 152 and a sleeve 154 that receives sound producing member 152. Sound producing member 152 may be identical to sound producing member 142 but may also be advantageously configured substantially identical to sound producing member 142 with the exception of retention structures 142*c*. Therein, sleeve 154 may be identical or substantially similar to sleeve 54. Sleeve 154 comprises sleeve body 154*a* having apertures 154*f* that are preferably circular or oval in shape to provide an attractive appearance and may be arranged in one or more groupings comprising one or more apertures of varying sizes.

Each grouping may be disposed on approximately one fourth to three-fourths of the outer surface so that the toy comprises portions where the animal can have direct contact with sound-producing member 152 and feel an interaction.

FIG. 5*e* is a perspective view of a cross-section of a multi-material pet toy in accordance with one or more embodiments of the present invention. FIG. 5*f* is a cross-sectional view of the multi-material pet toy of FIG. 5*e*. A pet toy 160 comprises a sound producing member 162 and a sleeve 164 that receives sound producing member 162. Sound producing member 162 may be identical to sound producing member 142 but may also be advantageously configured substantially identical to sound producing member 142 with the exception of retention structures 142*c*.

Therein, sleeve 164 may be identical or substantially similar to sleeve 54. However, preferably, sleeve 164 comprises sleeve body 164*a* having feet and/or other features on which the animal may chew and not chew on the sound producing member. Sleeve body 164*a* comprises apertures 164*f* that may have any suitable shape but are preferably circular or oval in shape to provide an attractive appearance and may be arranged in one or more groupings comprising one or more apertures of varying sizes. Each grouping may be disposed on approximately one fourth to one half of the outer surface of toy 164 excluding the feet so that the toy comprises portions where the animal can have direct contact with sound-producing member 162 and feel an interaction.

Most preferably, sleeve 164 is configured to have apertures 164*f* that are substantially longitudinal and/or substantially rectangular and may form a cage. Apertures 164*f* may total approximately one third to two-thirds of the outer surface of toy 164 excluding the feet so that the toy comprises portions where the animal can have direct contact with sound-producing member 162 and feel an interaction. Preferably, an aperture 165*a* is disposed in the top of the pet toy and is used to insert the sound producing member into the sleeve. Therein, the method discussed with respect to FIGS. 11*a* and 11*b* may be suitably used.

FIG. 6*a* is a perspective view of a sound-producing member of a multi-material pet toy in accordance with one or more embodiments of the present invention. FIG. 6*b* is a partial cross-sectional view of a multi-material pet toy having the sound-producing member of FIG. 6*a*. FIG. 6*c* is a partial perspective cross-sectional view of a multi-material pet toy having the sound-producing member of FIG. 6*a*. In accordance with one or more embodiments of the present invention, a multi-material pet toy 60 similar to multi-material pet toy 40. Thus, multi-material pet toy 60 comprises a sound-producing member 62 and a sleeve 64 that receives sound-producing member 62.

However, sound-producing member 62 has a body shape that does not match the shape of sleeve 64. Therein, retention structures are not necessary. Preferably, sleeve 60 includes a wall thickness that is suitable to maintain the shape of the body.

FIG. 7*a* is a perspective view of a multi-material pet toy in accordance with one or more embodiments of the present invention. FIG. 7*b* is a front view of the multi-material pet toy of FIG. 7*a*. FIG. 7*c* is a cross-sectional view of the multi-material pet toy of FIG. 7*a*. In accordance with one or more embodiments of the present invention, a multi-material pet toy 70 comprises a sound-producing member 72, a sleeve 74 which is overmolded onto the sound-producing member, and a cap 76.

Sound-producing member 72 comprises first material 2, which may be in any suitable shape 72*a*, including the multiple arm structure depicted, which is substantially hollow and has an inner space 72*b*. A sleeve 74 is overmolded onto sound-producing member 72 and comprises a first material 4. A portion of sound-producing member 72 comprises a flattened area 72*c* and a retaining structure 72*d* defining an aperture 72*e*. These may also be overmolded by the sleeve.

Preferably, cap 76 is made of any suitable material comprises an extension 76*a* that is received in aperture 72*e* to secure the cap to the multi-material pet toy. Preferably, cap 76 is glued using any suitable adhesive.

By sealing the sound-producing member, the volume of noise originating from the sound-producing member is lessened and the crinkling, crackling, and/or rustling noise characteristic is placed in the lower range increasing the attractive quality for animals and making the toy more pleasant for the animal's owner. Therein, cap 76 preferably serves to stabilize the inner space of the sound producing member to prevent collapse of the sound producing member by retaining air to act as a counterforce when the sound producing member is being compressed such as by a bite. Thus, the life of the sound producing member is extended.

To increase the various sound properties, the inner space of the sound-producing member may be filled with a polyfill material 78 of any suitable kind to produce a deeper and richer sound. In addition or instead, polyfill material 78 preferably serves to stabilize the inner space of the sound producing member to prevent collapse of the sound producing member. Rather than using a polyfill material, any other suitable material may be used instead of polyfill material 78 for the same purposes.

FIG. 8*a* is a front view of a multi-material pet toy in accordance with one or more embodiments of the present invention. FIG. 8*b* is a view of the use of the multi-material pet toy of FIG. 8*a*. FIG. 8*c* is a perspective view of the multi-material pet toy of FIG. 8*a*. In accordance with one or more embodiments of the present invention, a multi-material pet toy 80 comprises a first body 82 made of material 2 into which a second body 84 made of material 4 is inserted. Preferably, body 82 is hollow and may comprise any suitable shape 82*a*, which may include decorations 82*b* that aid in handling multi-material pet toy 80. One or more flaps 82*c* are disposed at one or more open ends 82*d*.

Second body 84 comprises any suitable shape 84*a* and is a substantially hollow member. It may be closed and contain one or more squeakers through which ambient air passes. In the alternative, second body 84 may have an air hole and lack a squeaker.

In use, second body 84 is inserted through one or more open ends 82*d* into an inner space of body 82. Flaps 82*c* deform and preferably hold the second body in place relative to first body 82. When the animal has played with multi-material pet toy 80 and the first body has been damaged beyond use, a new replacement first body 82 may be purchased. The second body is removed by pulling it from the used first body 82 and second body 84 is then inserted into the new first body 82.

FIG. 9*a* is a front view of a multi-material pet toy in accordance with one or more embodiments of the present invention. FIG. 9*b* is a perspective view of the multi-material pet toy of FIG. 9*a*. In accordance with one or more embodiments of the present invention, a multi-material pet toy 90 comprises a first body 92 made of material 2 into which a second body 94 made of material 4 is inserted.

Preferably, first body 92 comprises any suitable shape 92*a* and is a substantially hollow member. It may be closed and contain one or more squeakers through which ambient air passes. In the alternative, first body 92 may have an air hole and lack a squeaker.

Second body 94 is hollow and may comprise any suitable shape 94*a*, which may include decorations 94*b* that aid in handling multi-material pet toy 90. One or more flaps 94*c* are disposed at one or more open ends 94*d*.

In use, first body 92 is inserted through one or more open ends 94*d* into an inner space of body 94. Flaps 94*c* deform and preferably hold the first body in place relative to second body 94. When the animal has played with multi-material pet toy 90 and the first body has been damaged beyond use, a new replacement first body 92 may be purchased. The damaged first body is removed by pulling it from second body 94 and the new undamaged first body 92 is then inserted into second body 94.

FIG. 10 is front view of a multi-material pet toy in accordance with one or more embodiments of the present invention. In accordance with one or more embodiments of the present invention, a multi-material pet toy 100 is suitable for playing by a pet, such as a dog. The multi-material pet toy includes a first member 102, preferably an inner member, and a second member 104, preferably an outer member, that preferably protects the first member. The first member comprises one or more materials 102*a* that have a mouth-feel, i.e., is a mouth-feel member.

The multi-material pet toy provides significant advantages over other toys. First, the multi-material pet toy does not include a sound-producing member or air passing through it and, thus, does not emit sudden high-pitched squeaks as are common to squeakers, as an attractant for the pet. Second, the mouth-feel member is economical to produce, and, is easily replaceable when damaged. Third, when at least portions of the mouth-feel member and the outer member are exposed, the difference in material between the two members provides an attraction to pets due to the different textures of each member.

Moreover, using a second member provides that when the inner member is damaged, pieces of the inner member are preferably retained within the second member.

The mouth-feel material 102*a* of inner member 102 may be a plush fabric material, a canvass material, fur or fur-like material, and/or any other suitable material having a texture that produces a mouth-feel in the pet. The plush fabric material may be any suitable plush fabric material having any suitable deep or low pile or in between, fabric count, and be made of natural or synthetic material; but preferably are deep pile such that the pile comprise one or more portions 102*b* that extend through one or more openings 104*a* in the outer member for a superior mouth-feel. The fur or fur-like material may be natural or synthetic, and may comprise any length of fiber/hair length. Likewise, it is preferred that the fur fibers/hair comprise one or more portions 102*b* that extend through one or more openings 104*a* in the outer member for a superior mouth-feel.

The inner member may have any suitable shape that preferably is cooperative with one or more inner spaces of member 104. Member 102 may also be filled with a material, such as fibrous or shredded polymer, to provide greater resistance and playability for the toy.

The outer member 104 may be made of a vinyl, natural and/or synthetic rubber, and/or any other elastic material and may be overmolded or have another structure placed over it. The material from which the outer member is made preferably also has a hot-tear resistance suitable for inserting the member made of the first material, but not tearing. Member 104 may have any suitable shape, but preferably includes one or more holes 104*a* and one or more inner spaces 104*b* into which member 102 is inserted through one or more holes 104*a* or through a special opening (not shown) provided in member 104.

In use, multi-material pet toy 100 may be played with by a pet. Therein, portions 102*b* that extend through openings 104*a* provide an attractant mouth-feel for the pet.

FIGS. 11*a* and 11*b* are a perspective view of a fixture making a multi-material pet toy in accordance with one or more embodiments of the present invention. In accordance with one or more embodiments of the present invention, multi-material pet toy 10-160 may be made by hand. Therein, the sound-producing member, such as sound-producing member 12, 22, 32, 42, 52, 62, 72, and 142 is received in the sleeve, such as sleeve 14, 24, 34, 44, 54, 64, 74, 154, and 164. While, for example, sleeve 34 comprises a longitudinal slot 34e that easily permits the sound producing member to be received in the inner space of sleeve 34, sleeves 54, 64, 74, 154, and 164 must be stretched to receive the sound-producing member. Therein, the second material 4 from which sleeves 54, 64, 74, 154, and 164 are made preferably comprise a suitable hot-tear resistance that permits the insertion of the respective sound producing member through a hole without tearing the respective sleeve and then returning the hole to substantially its pre-opened size. This method may also be used for multi-material pet toy 100 wherein the inner member 102 is inserted into member 104.

The method may be improved by the use of a fixture 200. Fixture 200 comprises a framework 202 that provide an ergonomic and efficient working space and/or support. At least one fixed grasping unit 204a and one or more movable grasping units 204b work cooperatively to open a hole or aperture in a member or sleeve, such as those taught with respect to multi-material pet toy 10-160 or any other type of toy. Each grasping unit preferably has an L-shape, S-shape, or any other suitable shape for being disposed into the opening and extending into an inner space by securely retaining an edge of the opening or aperture. The movable grasping units 204b may be movable by linear actuators that are foot-controlled by user of the fixture.

In use, units 204a and 204b are first disposed so that the end portions 204c of each unit are proximate to each other and fit into the hole or aperture in the member or sleeve, such as those taught with respect to multi-material pet toy 10-160 or any other type of toy, and securely retain the edge of the opening or aperture. Movable units 204b then move distal from the portion 204c of unit 204a. This causes the opening or aperture to widen. A sound-producing member such as the one taught above, an inner member such as the one taught above, or any other type insert having a dimension or cross-sectional area that is wider than a dimension or planar or non-planar area of the hole or aperture is then inserted into the hole or aperture using a tool or other suitable device. Thereafter, the multi-material pet toy is pulled off the grasping units 204a and 204b or the movable grasping units are moved proximate to the fixed unit 204a and the hole or aperture returns to substantially its initial state and the toy is removed along with the now-mounted sound-producing member, inner member, and/or other insert.

The method may in addition be used to make a multi-material pet toy 120. Toy 120 may comprise a shell 120a having an opening 120b providing access to an inner space 120c. An insert 122 comprises a rope 122a having a knot 122b that is an insert into inner space 120c using the above method.

Figure 11D:
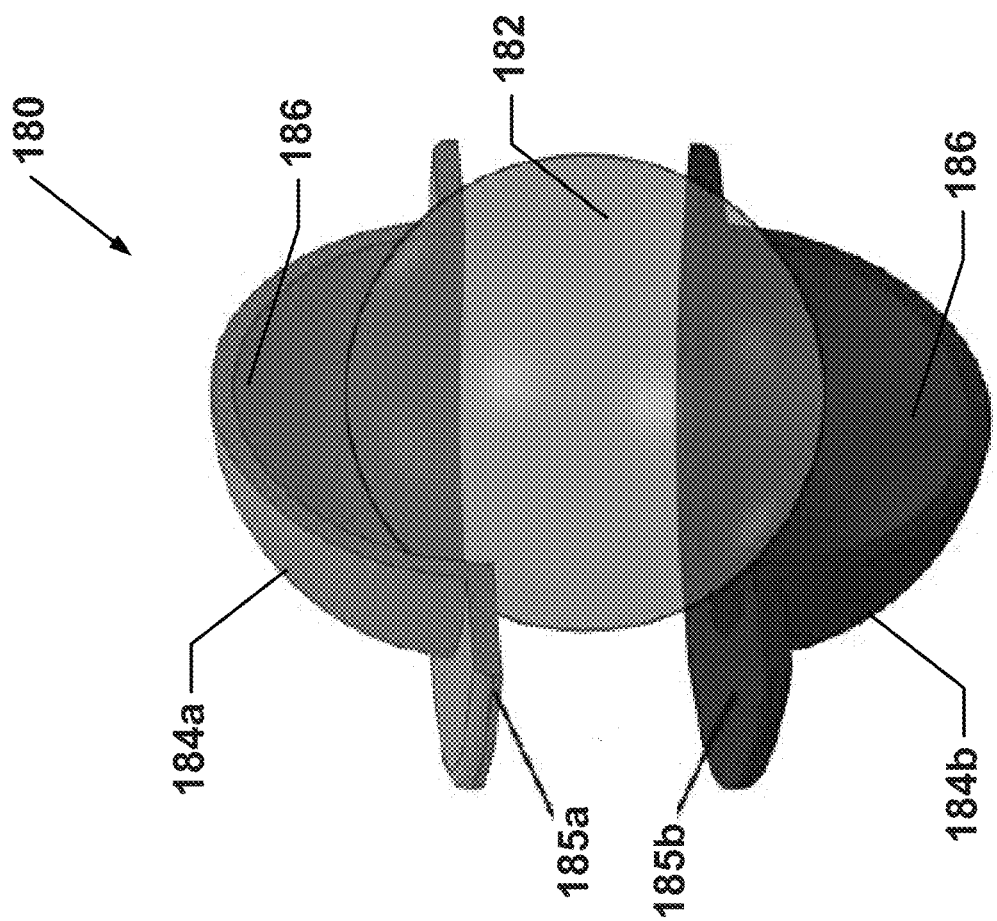
FIG. 11*d* is an exploded partial cross-sectional view of the multi-material pet toy of FIG. 11*c*.
Figure 11C:
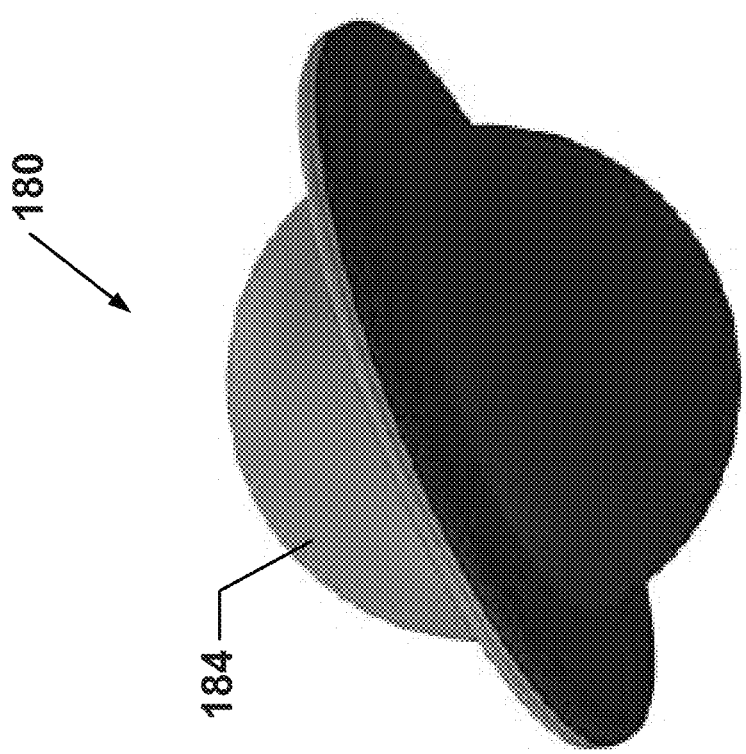
FIG. 11*c* is a perspective view of a multi-material pet toy in accordance with one or more embodiments of the present invention.

In accordance with one or more embodiments of the present invention, the multi-material pet toy of the present invention may be made by being gluing one or more portions that at least in part define a sleeve and, thus, retaining a sound producing member between the portions. FIG. 11c is a perspective view of a multi-material pet toy in accordance with one or more embodiments of the present invention. FIG. 11d is an exploded partial cross-sectional view of the multi-material pet toy of FIG. 11c.

Therein, a multi-material pet toy 180 comprises a sound producing member 182 and a sleeve 184. Sound producing member 182 may be identical to sound producing member 142 but may also be advantageously configured substantially identical to any other sound producing member taught herein. Sleeve 184 may be identical or substantially similar to sleeve 54 or any other sleeve taught herein. In addition and/or instead thereof, preferably, sleeve 184 comprises one or more sleeve portions that combine to make up sleeve 184. As illustrated by way of example only, sleeve 184 comprises a first sleeve portion 184a having an edge surface 185a and a second sleeve portion 184b having an edge surface 185b. The edge surface may have any suitable shape and may extend away from another portion of the respective sleeve, as illustrated, or may be a portion planar with the remainder of the sleeve or a combination thereof.

One or more of the sleeve portions preferably form a at least partially a receiving portion 186 in which the sound producing member is at least partially received.

An adhesive (not shown) of any suitable kind is placed on one or more portions of the edge surface to join one or more sleeve portions together and retain sound producing member 182. Advantageously, the edge portion may extend away from another portion of the sleeve portion so that the respective edge surface is easily reaches and an adhesive is easily applied and held in place. Instead of and/or in addition thereto, the edge portions and or the sleeve portions may be joined together using features that mechanically interlock the respective sleeve portions with each other.

To make multi-material pet toy 180, each sleeve portion and the sound producing member are produced and provided for the subsequent step. Therein, the sound producing member is then received in the receiving portion of at least one sleeve portion. An adhesive is added to one or more portions of the edge surface of one or more sleeve portions. All sleeve portions are then joined together retaining sound producing member 182.

In a further embodiment, a multi-material pet toy is usable by a pet, such as a dog, for enjoyment and entertainment. The multi-material pet toy comprises one or more first material body portions and one or more second material body portions that are secured respectively to the first material portions at one or more connecting portions present on each material portion.

Each of the material portions comprises a mouth-feel, i.e., a feel in the mouth of the pet, that is substantially different than another material portion. This provides an interest in the pet to play longer with the toy.

The first material portion preferably comprises a first material, which is one or more elastomeric or polymeric materials, including for example, a natural rubber, synthetic rubber, styrene butadiene styrene (SBS), or styrene ethylbutadiene styrene (SEBS).

The first material may have a mouth-feel that is heat transmissive, smooth, compact, dense, and/or bite resistant. Instead of or in addition thereto, the mouth-feel of the first material may be considered artificial.

The second material portion preferably comprises a fabric material. The second material portion may have an additional plush material covering that is integral or a plush covering made from a material layer secured to the fabric material. The plush material covering may be a natural or synthetic fur or fur-like material and have any suitable texture that distinguishes it from the first material portion. Therein, it is preferred to use Polyacrylonitrile.

The second material may have a mouth-feel that is heat retentive, irregular, loose, light weight, and/or not bite resistant. Instead of or in addition thereto, the mouth-feel of the second material may be considered natural.

It should be appreciated that the first material portion may comprise the second material in addition to or instead of the first material, and the second material portion may comprise the first material in addition to or instead of the second material.

FIG. 13a is a side view of a multi-material pet toy in accordance with one or more embodiments of the present invention. FIG. 13b is a cross-sectional view of the toy of FIG.

13a in accordance with one or more embodiments of the present invention. FIG. 2a is rear perspective view of a first material portion of the toy in FIG. 13a in accordance with one or more embodiments of the present invention. FIG. 14b is a front perspective view of a first material portion of the toy in FIG. 13a in accordance with one or more embodiments of the present invention. FIG. 14c is a cross-sectional view of a first material portion of the toy in FIG. 13a in accordance with one or more embodiments of the present invention.

Multi-material pet toy 310 comprises a first material portion 312, i.e., body 312, having any suitable shape to provide an interesting design. The body comprises one or more openings having respective one or more edges on the body and defining respective inner spaces in the body. Body 312 comprises one or more inner walls 312a that are preferably smooth and concave to permit secured seating of the second material portion in the connecting portion.

Therein, preferably, body 312 includes an edge 314, which extends along one or more portions of a perimeter of the body and defines a single large inner space 16. Inner space 316 may comprise one or more retaining spaces 316a that are preferably located at ends of body 312. The body comprises a connecting portion 318 comprising a connecting portion 318a that is disposed at one or more inner walls 312a including the inner walls proximate to retaining space 316a. A connecting portion 318b may also be disposed along edge 314. Therein, longitudinal portions of edge 314 are preferably disposed in one or more planes. Advantageously, locating edge 314 in one or more planes provides a more secure connecting portion since if the second material portion is joined along edge 314 a stronger bond is developed requiring forces that are capable having resultants acting in the multiple planes.

FIG. 15 is a side view of a second material portion of the toy of FIG. 13a in accordance with one or more embodiments of the present invention. A second material portion 320, body 320, may have any suitable shape 322, but preferably comprises a design or shape that suitably enhances body 312. Thus, if body 312 is a design of an animal, one or more portions of body 322 would preferably complete that design.

Body 320 is preferably a fabric structure 324 that is sewn into a closed structure having an inner space 326. The fabric structure comprises a bottom portion 324a and a plush material portion 324b having a peripheral edge.

A filling comprising any suitable material, but preferably polyfill, is provided in the inner space. A squeaker that operates via air moving through the squeaker may also be provided in inner space 326.

Body 320 further comprises one or more connecting portions 328, which may have any suitable design. A connecting portion 328a may be disposed at a bottom portion 324a of the fabric to match connecting portion 318a and/or an edge portion 328b of body 320 and, therein, preferably an edge portion of the plush material 324b, which matches connecting portion 318b.

To make toy 10, body 312 maybe molded by any suitable molding process for the material that is being used, such as injection molding when natural or synthetic rubber is used. Body 312 is preferably is a unitary structure.

Body 322 is preferably sewn from one or more fabric panels that are joined to form a closed structure. A portion of a seam is left open to insert filling and a squeaker. The seam is then closed retaining the filling and squeaker inside body 322. One or more of the fabric panels comprising the plush material is then attached if not already provided attached to the fabric panels.

With body 312 and body 322 completed, the toy is completed by joining the connecting portions 318 and 328 by heat treating, gluing, or other suitable means. Therein, gluing using Ethyl Cyanoacrylate is preferred. A layer of glue 330 may be disposed between connection portions 318 and 328.

In use, a pet playing with the multi-material pet toy 310 will have a different mouth-feel depending how the pet bites the toy. If more of body 312 than body 322 is in the mouth of the pet, the pet will experience a different texture. If the reverse is true, the pet will experience a furry texture.

Figure 16A:
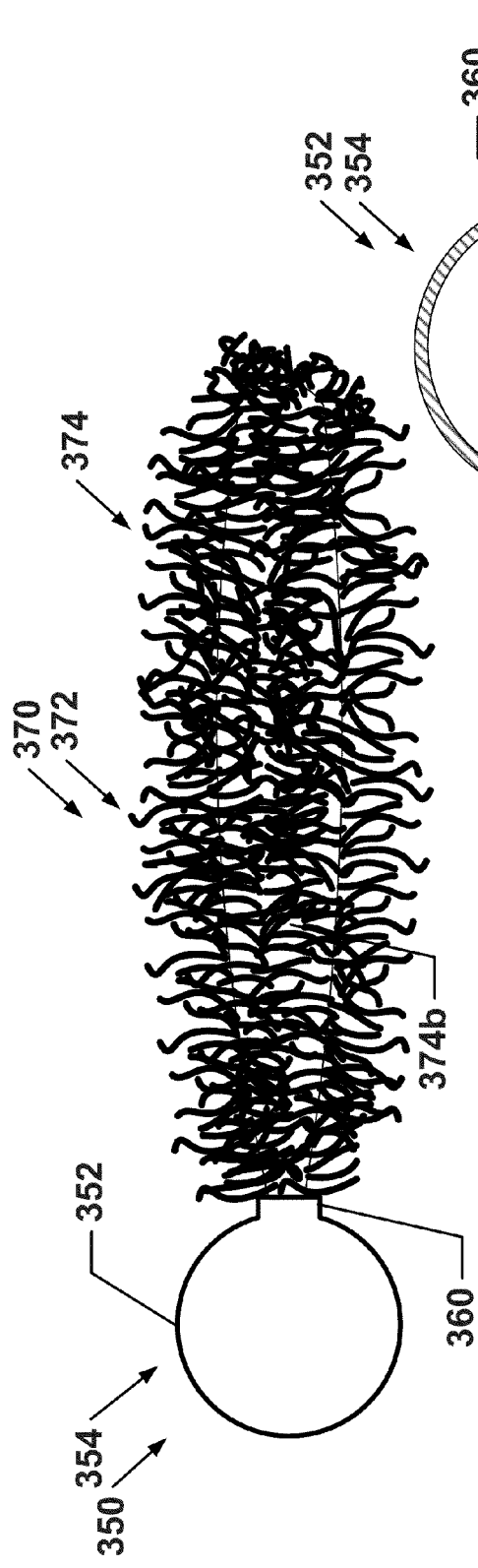
FIG. 16*a* is a side view of a multi-material pet toy in accordance with one or more embodiments of the present invention.
Figure 16C:
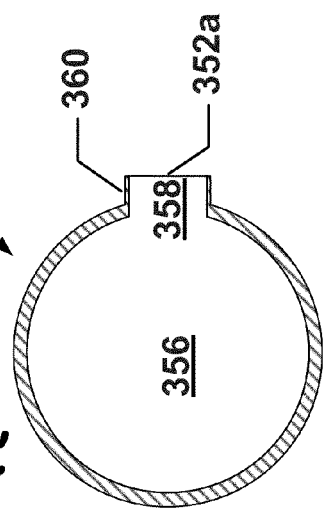
FIG. 16*c* is a cross-sectional view of a first and second material portion of the toy of FIG. 16*a* in accordance with one or more embodiments of the present invention.
Figure 16B:
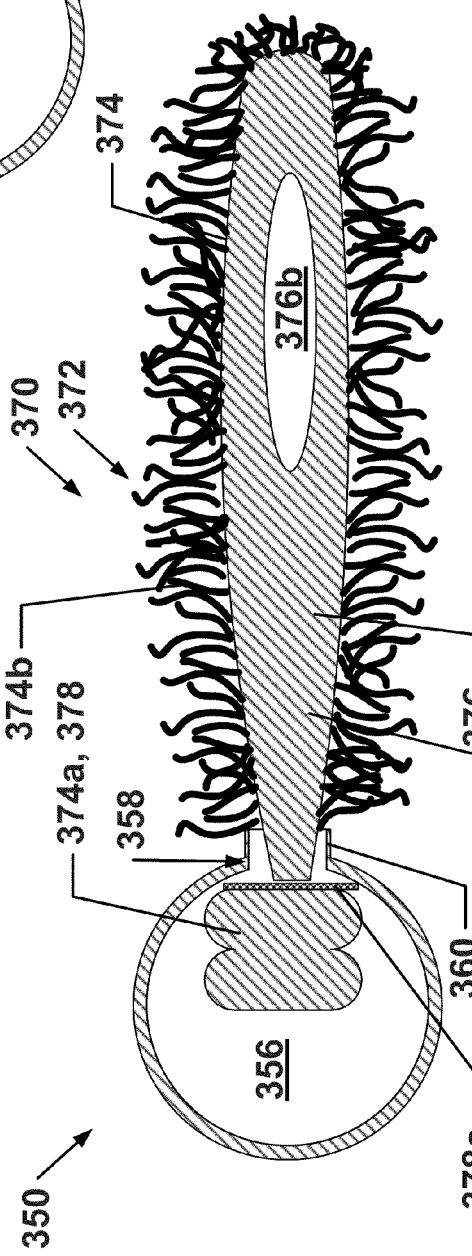
FIG. 16*b* is a cross-sectional view of the toy of FIG. 16*a* in accordance with one or more embodiments of the present invention.

FIG. 16a is a side view of a multi-material pet toy in accordance with one or more embodiments of the present invention. FIG. 16b is a cross-sectional view of the toy of FIG. 16a in accordance with one or more embodiments of the present invention. FIG. 16c is a cross-sectional view of a first and second material portion of the toy of FIG. 16a in accordance with one or more embodiments of the present invention.

Multi-material pet toy 350 includes a first material body portion 352, i.e., body 352, having a suitable shape 354 defining one or more inner spaces 356. Body 352 comprises one or more openings 352a in the body providing access to the respective one or more inner spaces 356. The one or more openings may comprise an edge or a collar 360 about a portion or the entire periphery of the respective opening.

A connecting portion 358 is formed by the constriction between the inner space 356 and the opening 352a.

Therein, preferably body 352 includes a single inner space 356 accessible by single opening 358 having a full peripheral collar 360. Body 352 comprises a shell structure in substantially the shape of a sphere signifying, for example, a head. Body 352 preferably has a thickness and having a thickness of between 4 mm and 10 mm.

Toy 350 includes a second material portion 370, i.e., body 370. Body 370 preferably comprises a design or shape 742 that is cooperative with the design of body 352, but has a different mouth-feel than the first material portion, i.e., body 352. Body 730 comprises a fabric structure 374 sewn into a closed structure and preferably is shaped to be a tail. The fabric structure comprises inner space 376.

The fabric structure comprises an enlargement 374a, such as a knot since this permits efficient and economical construction, is provided in body 372, preferably at an end portion of the body. Body 372 may also comprise a plush material portion 374b.

A filling 377a is provided comprising any suitable material, but preferably polyfill, is provided in the inner space. A squeaker 377b that operates via an air movement is also provided in inner space 376.

At a distal end, a connecting portion 378 comprising the enlargement is provided. A washer 378a, preferably in the shape of a flexible or semi-flexible planar member, is disposed adjacent to the enlargement.

Returning now to FIGS. 17a and 17b, for clarity, a simplification of toy 350 may be considered to be used in the figures.

In accordance with one or more embodiments of the present invention, multi-material pet toys 350 may be made by hand. Therein, body 370 is inserted in body 352. Therein, the first material portion 352 from which body 352 is made preferably comprises a suitable hot-tear resistance that permits the insertion of the respective sound producing member through a hole without tearing the respective sleeve and then returning the opening to substantially its pre-widened size.

The method may be improved by the use of a fixture 200, for example, shown in FIGS. 11a and 11b. Fixture 200 comprises a framework 202 that provide an ergonomic and efficient working space and/or support. At least one fixed grasping unit 204a and one or more movable grasping units 204b work cooperatively to widen opening 352a, such as that taught with respect to multi-material pet toy 350 or any other type of toy. Each grasping unit preferably has an L-shape, S-shape, or any other suitable shape for being disposed into the opening and extending into an inner space by securely retaining an edge of the opening. The movable grasping units 204b may be movable by linear actuators that are foot-controlled by user of the fixture.

In use, units 204a and 204b are first disposed so that the end portions 204c of each unit are proximate to each other and fit into opening, such as those taught with respect to multi-material pet toy 350 or any other type of toy, and securely retain the edge of the opening or aperture. Movable units 204b then move distal from the portion 204c of unit 204a. This causes the opening to widen. Connecting portion 378 having a dimension or cross-sectional area that is wider than a dimension or planar or non-planar area of the hole or aperture is then inserted into the hole or aperture using a tool or other suitable device. Thereafter, the multi-material pet toy is pulled off the grasping units 204a and 204b or the movable grasping units are moved proximate to the fixed unit 204a and the hole or aperture returns to substantially its initial state and the toy is removed along with the now-mounted body 370.

Each of the multi-material pet toys 310 and 350 may incorporate features of one or more of the other multi-material pet toys and may be made as taught with respect to any other toy herein. For example, a wall thickness disclosed for one multi-material pet toy may be used with another multi-material pet toy. Similarly, details disclosed with one embodiment may be readily used with another.

Each of the multi-material pet toy may incorporate features of one or more of the other multi-material pet toys and may be made as taught with respect to any other toy herein. For example, a wall thickness disclosed for one multi-material pet toy may be used with another multi-material pet toy. Similarly, decorations, apertures, materials chosen for making one embodiment, and/or fillable materials disclosed with one embodiment may be readily used with another.

While the invention has been described in conjunction with specific embodiments, it is to be understood that many alternatives, modifications, and variations will be apparent to those skilled in the art in light of the foregoing description.

The invention claimed is:

1. A multi-material pet toy comprising:
   a first member comprising an attractant structured to make the multi-material pet toy interesting to a pet;
   a second member having an interior and being structured to protect the first member to lengthen a serviceable life of the first member;
   the second member having formed therein an opening through which the first member is receivable into the interior;
   wherein the first member comprises an airtight seal and has air trapped within the first member;
   wherein the first member comprises a shell structure;
   wherein the shell structure comprises a sound-producing member, the sound producing member making a noise without the air trapped within the first member passing through the sound-producing member; and
   wherein the second member comprises a protective member for protecting the sound-producing member; and
   wherein the sound-producing member comprises polyethylene teraphthalate.

2. The multi-material pet toy of claim 1, wherein the protective member comprises an elastomeric material.

3. The multi-material pet toy of claim 2, wherein protective member has the opening formed therein, and wherein the elastomeric material has a hot-tear resistance sufficient to pass the sound-producing member through the opening.

4. A multi-material pet toy comprising:
   a first member comprising an attractant structured to make the multi-material pet toy interesting to a pet;
   a second member having an interior and being structured to protect the first member to lengthen a serviceable life of the first member;
   the second member having formed therein an opening through which the first member is receivable into the interior;
   wherein the first member comprises an airtight seal and has air trapped within the first member; and
   wherein the seal consists of a hot melt adhesive.

5. A multi-material pet toy comprising:
   a first member comprising an attractant structured to make the multi-material pet toy interesting to a pet;
   a second member having an interior and being structured to protect the first member to lengthen a serviceable life of the first member;
   the second member having formed therein an opening through which the first member is receivable into the interior;
   wherein the first member comprises an airtight seal and has air trapped within the first member; and
   wherein the airtight seal consists of a material having a melting point between 250 F and 380 F.

6. A multi-material pet toy comprising:
   a first member comprising an attractant structured to make the multi-material pet toy interesting to a pet;
   the first member comprising a shell structure that forms a sound-producing member, the sound-producing member being structured to make a noise and having air trapped within the sound-producing member;
   a second member having an interior and including a protective member structured to protect the sound-producing member;
   the sound-producing member being situated in the interior;
   the second member having an opening formed therein through which the sound-producing member is receivable into the interior; and
   wherein the second member is elongated and has a closed end and an open end, the opening being formed in the open end.

7. A multi-material pet toy comprising:
   a first member comprising an attractant structured to make the multi-material pet toy interesting to a pet;
   a second member having an interior and being structured to protect the first member to lengthen a serviceable life of the first member;
   the second member having formed therein an opening through which the first member is receivable into the interior;
   wherein the first member comprises an airtight seal and has air trapped within the first member; and
   wherein the second member is elongated and has a closed end and an open end, the opening being formed in the open end.

8. The multi-material pet toy of claim 7, wherein the first member is removable from the interior via the opening and is replaceable with another first member.

9. A multi-material pet toy comprising:
   a first member comprising an attractant structured to make the multi-material pet toy interesting to a pet;

a second member having an interior and being structured to protect the first member to lengthen a serviceable life of the first member;

the second member having formed therein an opening through which the first member is receivable into the interior;

wherein the first member comprises an airtight seal and has air trapped within the first member; and wherein the opening is a longitudinal slot.

* * * * *